(12) United States Patent
Larsson et al.

(10) Patent No.: US 9,198,199 B2
(45) Date of Patent: Nov. 24, 2015

(54) METHODS USING HARQ-ACK CODEBOOKS FOR MULTI-FLOW COMMUNICATIONS AND RELATED WIRELESS TERMINALS AND RADIO NETWORK NODES

(71) Applicant: Telefonaktiebolaget L M Ericsson (publ), Stockholm (SE)

(72) Inventors: Erik Larsson, Uppsala (SE); Peter Von Wrycza, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 213 days.

(21) Appl. No.: 13/885,319

(22) PCT Filed: Mar. 15, 2013

(86) PCT No.: PCT/SE2013/050285
§ 371 (c)(1),
(2) Date: May 14, 2013

(87) PCT Pub. No.: WO2013/141790
PCT Pub. Date: Sep. 26, 2013

(65) Prior Publication Data
US 2014/0293884 A1 Oct. 2, 2014

Related U.S. Application Data

(60) Provisional application No. 61/612,610, filed on Mar. 19, 2012, provisional application No. 61/638,673, filed on Apr. 26, 2012.

(51) Int. Cl.
*H04W 74/08* (2009.01)
*H04L 1/18* (2006.01)
(Continued)

(52) U.S. Cl.
CPC ......... *H04W 74/0833* (2013.01); *H04L 1/0073* (2013.01); *H04L 1/1607* (2013.01); *H04L 1/1812* (2013.01)

(58) Field of Classification Search
None
See application file for complete search history.

(56) References Cited

U.S. PATENT DOCUMENTS

2008/0212520 A1* 9/2008 Chen et al. .................... 370/320
2011/0081901 A1 4/2011 Moulsley et al.
(Continued)

FOREIGN PATENT DOCUMENTS

EP 2 194 740 A1 6/2010
WO WO 2008/041098 A2 4/2008
(Continued)

OTHER PUBLICATIONS

"Robust HARQ-ACK Design for MF-HSDPA"; Not yet published International Application No. PCT/SE2012/051227 filed on Nov. 9, 2012; 13 pages.
(Continued)

*Primary Examiner* — Jason Mattis
*Assistant Examiner* — Hong Shao
(74) *Attorney, Agent, or Firm* — Myers Bigel Sibley & Sajovec, P.A.

(57) ABSTRACT

At least one transport data block is transmitted from a first sector of a network over a downlink to a wireless terminal during a time resource element for a multi-flow downlink transmission to the wireless terminal, and at least one transport data block is transmitted from a second sector of the network over a downlink to the wireless terminal during the time resource element for the multi-flow downlink transmission. A feedback message is received for the time resource element from the wireless terminal, wherein the feedback message includes a HARQ-ACK codeword selected from a HARQ-ACK codebook providing HARQ-ACK feedback for the at least one transport data block transmitted from the first sector and for the at least one transport data block transmitted from the second sector. The HARQ-ACK codeword is interpreted for the at least one transport data block transmitted from the first sector based on the first sector being a primary sector for the multi-flow downlink transmission.

24 Claims, 13 Drawing Sheets

(51) Int. Cl.
*H04L 1/00* (2006.01)
*H04L 1/16* (2006.01)

(56) References Cited

U.S. PATENT DOCUMENTS

| | | | |
|---|---|---|---|
| 2012/0163185 A1* | 6/2012 | Zhang et al. | 370/241 |
| 2012/0257568 A1* | 10/2012 | Cai et al. | 370/328 |
| 2013/0258989 A1* | 10/2013 | Ribeiro et al. | 370/329 |

FOREIGN PATENT DOCUMENTS

| | | |
|---|---|---|
| WO | WO 2009/134357 A1 | 11/2009 |
| WO | WO 2010/107927 A2 | 9/2010 |
| WO | WO 2011/021861 A2 | 2/2011 |
| WO | WO 2012/095188 A1 | 7/2012 |

OTHER PUBLICATIONS

International Searching Report, PCT/SE2013/050022, May 7, 2013.
Written Opinion of the International Searching Authority, PCT/SE2013/050022, May 7, 2013.
Nammi, et al., U.S. App. No. 13/328,139, filed Dec. 16, 2011.
I. Emre Telatar, "Capacity of Multi-antenna Gaussian Channels", Lucent Technologies, Bell Laboratories, Murray Hill, NJ, Oct. 1995; *European Transactions on Telecommunications*, vol. 1, No. 6, pp. 585-595, Nov./Dec. 1999.
HSPA session chairman (Thomas Salzer, Huawei), "Summary of 4-branch MIMO for HSPA session", R1-114366; 3GPP TSG-RAN WG1 Meeting #67, Item 6.4; San Francisco, CA USA, Nov. 14-18, 2011, 2 pp.
Samsung, "Considerations on codewords to layers mapping for downlink MIMO", 3GPP TSG RAN WG1 Meeting #47bis, R1-070130; Sorrento, Italy, Jan. 15-19, 2007, 8pp.
Ericsson, "New WI: Four Branch MIMO transmission for HSDPA (core part)", 3GPP TSG-RAN Meeting #53, RP-111393, vol. 13.1.2; Fukuoka, Japan, Sep. 13-16, 2011, 6 pp.
Ericsson, "New Wi: Four Branch MIMO transmission for HSDPA (feature part)", 3GPP TSG-RAN Meeting #53, RP-111393, vol. 13.1,2; Fukuoka, Japan, Sep. 13-16, 2011, 5 pp.
Ericsson, "New WI: Four Branch MIMO transmission for HSDPA (performance part)", 3GPP TSG-RAN Meeting #53, RP-111393, vol. 13.1.2; Fukuoka, Japan, Sep. 13-16, 2011, 5 pp.
Ericsson, "4-branch MIMO for HSDPA", 3GPP TSG-RAN WG1 Meeting #65, R1-111763; Barcelona, Spain, May 9-13, 2011, 17 pp.
QUALCOMM Incorporated, "MIMO in MP-HHSDPA", 3GPP TSG RAN WG1 Meeting #67, R1-114016; San Francisco, CA, Nov. 14-18, 2011, 8pp.
Nokia Siemens Networks, Nokia, "Performance of Multiflow with single-stream MIMO", 3GPP TSG RAN WG1 Meeting #67, R1-114149; San Francisco, CA, Nov. 14-18, 2011, 10pp.
Ericsson, "Data Bundling in a 2 codeword MIMO System", 3GPP TSG-RAN WG1 Meeting #68, R1-120356; Dresden, Germany, Feb. 6-10, 2012, 9 pp.
Ericsson, "Feedback Channel Design for four branch MIMO System", 3GPP TSG-RAN WG1 Meeting #68, R1-120361; Dresden, Germany, Feb. 6-10, 2012, 7 pp.
Ericsson, "HARQ-ACK codebook for SF-DC MF-HSDPA with MIMO", 3GPP TSG-RAN WG1 Meeting #69, R1-122819; Prague, Czech Republic, May 21-25, 2012, 8 pp.
Ericsson, "Introduction of 4Tx_HSDPA", TSG-RAN1 Meeting #70bis, R1-124506, Change Request, 25.212, Version 11.0.0; San Diego, USA, Oct. 8-12, 2012, 45pp.
Ericsson, "Selection of transport blocks with 2 codeword in four branch MIMO", 3GPP TSG-RAN WG2 Meeting #77, R2-120798; Dresden, Germany, Feb. 6-10, 2012, 3 pp.
Ericsson, "Introduction of 4Tx_HSDPA in 25,331", 3GPP TSG-RAN WG2 Meeting #79bis, [*Draft*] R2-125043, Change Request, 25.331, Version 11.3.0; Bratislava, Slovakia, Oct. 8-12, 2012, 131pp.
3GPP TS 25.212 V11.4.0 (Dec. 2012); "Technical Specification Group Radio Access Network"; $3^{rd}$ Generation Partnership Project; Multiplexing and channel coding (FDD); (Release 11); p. 112-113 and 128-129.
3GPP TS 25.214 V10.1.0 (Dec. 2010); "Technical Specification Group Radio Access Network"; $3^{rd}$ Generation Partnership Project; Physical layer procedures (FDD); (Release 10); 99pp.
3GPP TS 25.321 V11.0.0 (Dec. 2011) "Technical Specification Group Radio Access Network"; $3^{rd}$ Generation Partnership Project; Medium Access Control (MAC) Protocol Specification (Release 11), 198 pp.
3GPP TS 25.321 V11.3.0 (Dec. 2012) "Technical Specification Group Radio Access Network"; $3^{rd}$ Generation Partnership Project; Medium Access Control (MAC) Protocol Specification (Release 11), 207 pp.
International Preliminary Report on Patentability Corresponding to International Application No. PCT/SE2013/050285; Date of Mailing: Oct. 2, 2014; 10 Pages.
InterDigital Communications, LLC, "HS-DPCCH design considerations for HSDPA MF-TX", 3GPP TSG-RAN WG1 Meeting #67, R1-114174, San Francisco, USA, Nov. 14-18, 2011, 6 Pages.
Ericsson, ST-Ericsson, "Introduction of 8C-HSDPA", 3GPP TSG-RAN WG1 Meeting #66, R1-112875, Athens, Greece, Aug. 22-26, 2011, 128 Pages.
European Search Report, EP Application No. 13763730.2, Feb. 17, 2015, 5 pages.

* cited by examiner

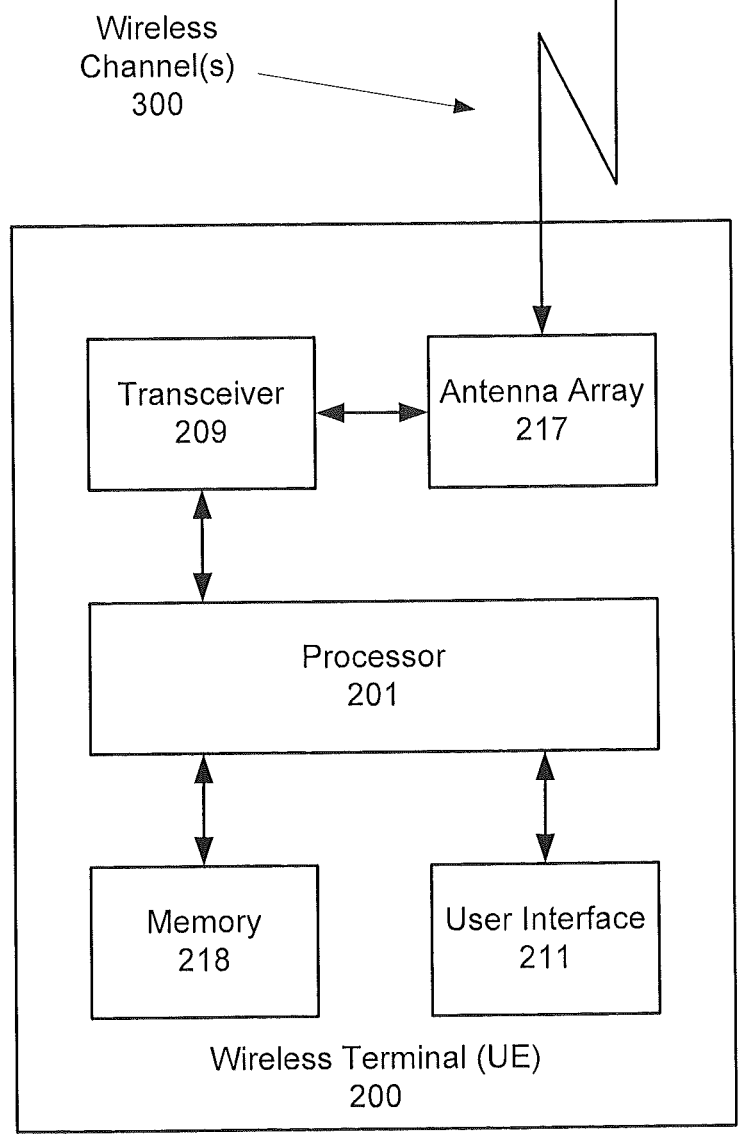

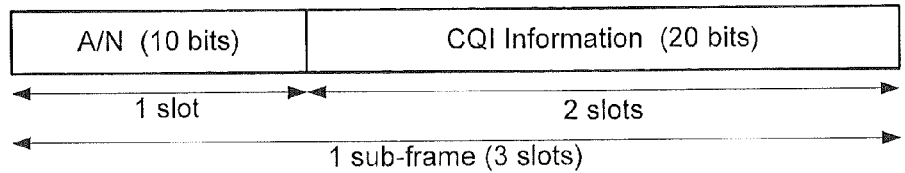

Figure 6A

HARQ-ACK Codebook

| | HARQ-ACK message to be transmitted Cell A' / Cell B" | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|---|
| 1 | A/D | 0 | 0 | 1 | 1 | 0 | 1 | 1 | 1 | 0 | 0 |
| 2 | N/D | 1 | 0 | 0 | 0 | 0 | 0 | 0 | 0 | 1 | 1 |
| 3 | AA/D | 1 | 1 | 1 | 0 | 0 | 1 | 1 | 1 | 1 | 0 |
| 4 | AN/D | 0 | 1 | 0 | 1 | 1 | 1 | 1 | 1 | 1 | 0 |
| 5 | NA/D | 0 | 1 | 0 | 0 | 0 | 0 | 1 | 1 | 1 | 1 |
| 6 | NN/D | 0 | 1 | 0 | 0 | 1 | 1 | 0 | 0 | 1 | 1 |
| 7 | D/A | 1 | 0 | 1 | 1 | 1 | 1 | 1 | 0 | 1 | 0 |
| 8 | D/N | 1 | 1 | 0 | 1 | 1 | 0 | 0 | 1 | 1 | 1 |
| 9 | D/AA | 1 | 0 | 1 | 1 | 0 | 0 | 1 | 1 | 1 | 1 |
| 10 | D/AN | 0 | 0 | 0 | 0 | 1 | 1 | 1 | 0 | 0 | 0 |
| 11 | D/NA | 0 | 1 | 0 | 1 | 0 | 0 | 0 | 0 | 0 | 1 |
| 12 | D/NN | 1 | 1 | 1 | 0 | 1 | 0 | 0 | 0 | 1 | 0 |
| 13 | A/A | 0 | 0 | 1 | 0 | 1 | 0 | 0 | 0 | 0 | 1 |
| 14 | A/N | 0 | 1 | 1 | 1 | 0 | 0 | 0 | 1 | 1 | 0 |
| 15 | N/A | 1 | 0 | 0 | 0 | 1 | 1 | 1 | 1 | 1 | 1 |
| 16 | N/N | 1 | 1 | 0 | 1 | 0 | 0 | 1 | 0 | 1 | 0 |
| 17 | A/AA | 0 | 1 | 1 | 1 | 1 | 0 | 1 | 0 | 1 | 1 |
| 18 | A/AN | 1 | 0 | 1 | 1 | 0 | 0 | 0 | 0 | 0 | 0 |
| 19 | A/NA | 1 | 1 | 1 | 1 | 1 | 0 | 1 | 1 | 0 | 0 |
| 20 | A/NN | 1 | 1 | 1 | 1 | 0 | 1 | 0 | 0 | 1 | 1 |
| 21 | N/AA | 0 | 0 | 1 | 0 | 1 | 0 | 1 | 1 | 1 | 0 |
| 22 | N/AN | 0 | 1 | 0 | 1 | 1 | 1 | 1 | 1 | 0 | 1 |
| 23 | N/NA | 1 | 1 | 1 | 0 | 0 | 0 | 0 | 1 | 0 | 1 |
| 24 | N/NN | 0 | 1 | 1 | 1 | 1 | 1 | 0 | 0 | 0 | 0 |
| 25 | AA/A | 0 | 0 | 0 | 1 | 1 | 0 | 1 | 1 | 0 | 1 |
| 26 | AA/N | 0 | 0 | 0 | 1 | 0 | 1 | 1 | 0 | 1 | 1 |
| 27 | AN/A | 1 | 1 | 0 | 0 | 1 | 0 | 1 | 0 | 0 | 1 |
| 28 | AN/N | 1 | 0 | 0 | 0 | 0 | 0 | 1 | 1 | 0 | 0 |
| 29 | NA/A | 1 | 0 | 0 | 1 | 1 | 1 | 0 | 0 | 0 | 1 |
| 30 | NA/N | 0 | 0 | 1 | 1 | 1 | 1 | 0 | 1 | 1 | 1 |
| 31 | NN/A | 1 | 0 | 1 | 0 | 0 | 1 | 1 | 0 | 0 | 1 |
| 32 | NN/N | 1 | 0 | 0 | 1 | 0 | 1 | 0 | 1 | 1 | 0 |

Figure 6B

HARQ-ACK Codebook – (continued)

| 33 | AA/AA | 0 | 0 | 1 | 0 | 1 | 0 | 0 | 0 | 0 | 1 |
|---|---|---|---|---|---|---|---|---|---|---|---|
| 34 | AA/AN | 1 | 0 | 1 | 0 | 1 | 1 | 0 | 1 | 0 | 0 |
| 35 | AA/NA | 1 | 1 | 0 | 1 | 0 | 0 | 1 | 0 | 1 | 0 |
| 36 | AA/NN | 1 | 1 | 0 | 1 | 0 | 1 | 1 | 1 | 0 | 1 |
| 37 | AN/AA | 0 | 1 | 0 | 1 | 1 | 0 | 1 | 0 | 0 | 0 |
| 38 | AN/AN | 0 | 1 | 0 | 1 | 1 | 1 | 0 | 1 | 0 | 1 |
| 39 | AN/NA | 0 | 1 | 0 | 0 | 0 | 1 | 0 | 0 | 0 | 0 |
| 40 | AN/NN | 0 | 0 | 1 | 1 | 0 | 0 | 0 | 0 | 1 | 1 |
| 41 | NA/AA | 0 | 1 | 1 | 0 | 0 | 0 | 1 | 0 | 0 | 0 |
| 42 | NA/AN | 0 | 0 | 0 | 1 | 1 | 0 | 0 | 0 | 1 | 0 |
| 43 | NA/NA | 1 | 0 | 0 | 0 | 1 | 1 | 1 | 1 | 1 | 1 |
| 44 | NA/NN | 0 | 1 | 1 | 1 | 0 | 0 | 0 | 1 | 1 | 0 |
| 45 | NN/AA | 0 | 0 | 1 | 0 | 1 | 1 | 1 | 0 | 1 | 1 |
| 46 | NN/AN | 0 | 0 | 1 | 0 | 0 | 1 | 0 | 1 | 0 | 1 |
| 47 | NN/NA | 1 | 1 | 1 | 0 | 1 | 1 | 1 | 0 | 0 | 0 |
| 48 | NN/NN | 1 | 1 | 1 | 0 | 0 | 0 | 1 | 0 | 1 | 1 |

Figure 7A
Site – 1 Schedules 1 Stream

| S1 | S2 | S1 | S2 | S1 | S2 |
|---|---|---|---|---|---|
| A | A | N | A | D | A |
| A | N | N | N | D | N |
| A | AN | N | AN | D | AN |
| A | NA | N | NA | D | NA |
| A | D | N | D | | |

Figure 7B
Site – 2 Schedules 1 Stream

| S1 | S2 | S1 | S2 | S1 | S2 |
|---|---|---|---|---|---|
| A | A | A | N | A | D |
| N | A | N | N | N | D |
| AN | A | AN | N | AN | D |
| NA | A | NA | N | NA | D |
| D | A | D | N | | |

Figure 7C
Site – 1 Schedules 2 Streams

| S1 | S2 | S1 | S2 | S1 | S2 |
|---|---|---|---|---|---|
| AA | A | AN | A | D | A |
| AA | N | AN | N | D | N |
| AA | AN | AN | AN | D | AN |
| AA | NA | AN | NA | D | NA |
| AA | D | AN | D | | |
| NA | A | NN | A | | |
| NA | N | NN | N | | |
| NA | AN | NN | AN | | |
| NA | NA | NN | NA | | |
| NA | D | NN | D | | |

Figure 7D
Site – 2 Schedules 2 Streams

| S1 | S2 | S1 | S2 | S1 | S2 |
|---|---|---|---|---|---|
| A | AA | A | AN | D | A |
| N | AA | N | AN | D | N |
| AN | AA | AN | AN | D | AN |
| NA | AA | NA | AN | D | NA |
| D | AA | D | AN | | |
| A | NA | A | NN | | |
| N | NA | N | NN | | |
| AN | NA | AN | NN | | |
| NA | NA | NA | NN | | |
| D | NA | D | NN | | |

Figure 8
HARQ-ACK Codebook

| | HARQ-ACK message to be transmitted Cell-A/Cell-B | | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|---|---|
| 1 | A/D | AA/D | 1 | 1 | 1 | 0 | 0 | 0 | 0 | 1 | 0 | 1 |
| 2 | N/D | NN/D | 1 | 1 | 0 | 0 | 1 | 0 | 1 | 0 | 0 | 1 |
| 3 | AN/D | | 1 | 0 | 1 | 1 | 0 | 0 | 0 | 0 | 0 | 0 |
| 4 | NA/D | | 0 | 0 | 0 | 1 | 0 | 1 | 1 | 0 | 1 | 1 |
| 5 | D/A | D/AA | 0 | 1 | 1 | 1 | 1 | 0 | 1 | 0 | 1 | 1 |
| 6 | D/N | D/NN | 0 | 0 | 1 | 0 | 1 | 0 | 0 | 0 | 0 | 1 |
| 7 | D/AN | | 1 | 1 | 1 | 1 | 1 | 0 | 1 | 1 | 0 | 0 |
| 8 | D/NA | | 0 | 1 | 0 | 0 | 0 | 0 | 1 | 1 | 1 | 1 |
| 9 | A/A  A/AA AA/A  AA/AA | | 1 | 0 | 0 | 1 | 0 | 1 | 0 | 1 | 1 | 0 |
| 10 | A/N  A/NN AA/N  AA/NN | | 1 | 0 | 1 | 0 | 0 | 1 | 1 | 0 | 0 | 1 |
| 11 | N/A  N/AA NN/A  NN/AA | | 0 | 0 | 0 | 1 | 1 | 0 | 1 | 1 | 0 | 1 |
| 12 | N/N  N/NN NN/N  NN/NN | | 0 | 1 | 1 | 1 | 1 | 1 | 0 | 0 | 0 | 0 |
| 13 | A/AN | AA/AN | 1 | 0 | 0 | 0 | 0 | 0 | 0 | 0 | 1 | 1 |
| 14 | A/NA | AA/NA | 1 | 1 | 1 | 0 | 0 | 1 | 1 | 1 | 1 | 0 |
| 15 | N/AN | NN/AN | 0 | 1 | 0 | 1 | 0 | 0 | 0 | 0 | 0 | 1 |
| 16 | N/NA | NN/NA | 1 | 1 | 1 | 0 | 1 | 0 | 0 | 0 | 1 | 0 |
| 17 | AN/A | AN/AA | 1 | 1 | 0 | 1 | 0 | 0 | 1 | 0 | 1 | 0 |
| 18 | AN/N | AN/NN | 0 | 1 | 1 | 0 | 0 | 0 | 1 | 0 | 0 | 0 |
| 19 | NA/A | NA/AA | 0 | 0 | 1 | 0 | 1 | 0 | 1 | 1 | 1 | 0 |
| 20 | NA/N | NA/NN | 0 | 1 | 0 | 0 | 1 | 1 | 0 | 0 | 1 | 1 |
| 21 | AN/AN | | 1 | 1 | 1 | 1 | 0 | 1 | 0 | 0 | 1 | 1 |
| 22 | AN/NA | | 1 | 0 | 0 | 0 | 0 | 0 | 1 | 1 | 0 | 0 |
| 23 | NA/AN | | 0 | 1 | 1 | 0 | 1 | 1 | 1 | 1 | 0 | 1 |
| 24 | NA/NA | | 0 | 0 | 0 | 1 | 1 | 0 | 0 | 0 | 1 | 0 |

Figure 12

| HARQ-ACK Message | | $w_0$ | $w_1$ | $w_2$ | $w_3$ | $w_4$ | $w_5$ | $w_6$ | $w_7$ | $w_8$ | $w_9$ |
|---|---|---|---|---|---|---|---|---|---|---|---|
| Primary Cell-A/A' | Secondary Cell-B/B" | | | | | | | | | | |
| ACK | DTX | 1 | 1 | 1 | 0 | 0 | 0 | 0 | 1 | 0 | 1 |
| NACK | DTX | 1 | 1 | 0 | 0 | 1 | 0 | 1 | 0 | 0 | 1 |
| DTX | ACK | 0 | 1 | 1 | 1 | 1 | 0 | 1 | 0 | 1 | 1 |
| DTX | NACK | 0 | 0 | 1 | 0 | 1 | 0 | 0 | 0 | 0 | 1 |
| ACK | ACK | 1 | 0 | 0 | 1 | 0 | 1 | 0 | 1 | 1 | 0 |
| ACK | NACK | 1 | 0 | 1 | 0 | 0 | 1 | 1 | 0 | 0 | 1 |
| NACK | ACK | 0 | 0 | 0 | 1 | 1 | 0 | 1 | 1 | 0 | 1 |
| NACK | NACK | 0 | 1 | 1 | 1 | 1 | 1 | 0 | 0 | 0 | 0 |

US 9,198,199 B2

METHODS USING HARQ-ACK CODEBOOKS FOR MULTI-FLOW COMMUNICATIONS AND RELATED WIRELESS TERMINALS AND RADIO NETWORK NODES

CROSS-REFERENCE TO RELATED APPLICATION

This application is a 35 U.S.C. §371 national stage application of PCT International Application No. PCT/SE2013/050285 filed on 15 Mar. 2013, which claims priority to U.S. Provisional Application No. 61/638,673 filed on 26 Apr. 2012 and U.S. Provisional Application No. 61/612,610 filed 19 Mar. 2012. The disclosures of all of the above referenced applications are hereby incorporated herein in their entireties by reference.

TECHNICAL FIELD

The present disclosure is directed to wireless communications and, more particularly, to Multi-Flow (MF) wireless communications and related network nodes and wireless terminals.

BACKGROUND

In a typical cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

Moreover, a cell area for a base station may be divided into a plurality of sectors surrounding the base station. For example, a base station may service three 120 degree sectors surrounding the base station, when the base station providing a respective directional transceiver and sector antenna array for each sector. Stated in other words, a base station may include three directional sector antenna arrays servicing respective 120 degree base station sectors surrounding the base station.

Multi-antenna techniques can significantly increase capacity, data rates, and/or reliability of a wireless communication system as discussed, for example, by Telatar in "Capacity Of Multi-Antenna Gaussian Channels" (European Transactions On Telecommunications, Vol. 10, pp. 585-595, November 1999). Performance can be improved if both the transmitter and the receiver for a base station sector are equipped with multiple antennas (e.g., an sector antenna array) to provide a multiple-input multiple-output (MIMO) communication channel(s) for the base station sector. Such systems and/or related techniques are commonly referred to as MIMO (Multiple-Input-Multiple-Output). The HSPA (High Speed Packet Access) standard is currently evolving with enhanced MIMO support and MIMO antenna deployments. A spatial multiplexing mode is provided for relatively high data rates in more favorable channel conditions, and a transmit diversity mode is provided for relatively high reliability (at lower data rates) in less favorable channel conditions.

In a downlink (DL) from a base station transmitting from a sector antenna array over a MIMO channel to a wireless terminal in the sector, for example, spatial multiplexing (or SM) allows the simultaneous transmission of multiple symbol streams over the same frequency from the base station sector antenna array for the sector. Stated in other words, multiple symbol streams are transmitted from the base station sector antenna array for the sector to the wireless terminal over the same downlink time/frequency resource element (TFRE) to provide an increased data rate. As used herein, a time/frequency resource element may also be referred to as a transmission time interval or TTI. In a downlink from the same base station sector transmitting from the same sector antenna array to the same wireless terminal, transmit diversity (e.g., using space-time codes) is the simultaneous transmission of the same symbol stream over the same frequency from different antennas of the base station sector antenna array. Stated in other words, the same symbol stream is transmitted from different antennas of the base station sector antenna array to the wireless terminal over the same time/frequency resource element (TFRE) to provide increased reliability of reception at the wireless terminal due to transmit diversity gain.

To further increase throughput at a sector/cell edge (also referred to as a soft handover or border area) using High Speed Downlink Packet Access (HSDPA), Multi-Flow-HSDPA (MF-HSDPA, also referred to as Multi-Flow-HSDPA or MP-HSDPA) has been proposed for 3$^{rd}$ Generation Partnership Project (3GPP) communications. In MF-HSDPA, transport data blocks of a data stream are transmitted from two different sectors/cells of the same or different base stations to a same wireless terminal in a border area between the sectors/cells. Intra NodeB aggregation (also referred to as intra node Multi-Flow communications) occurs when different transport data blocks of a data stream are transmitted from two different sectors of a same base station to a wireless terminal, and Inter NodeB aggregation (also referred to as inter node Multi-Flow communications) occurs when different transport data blocks of a data stream are transmitted from sectors/cells of different base stations to a wireless terminal. MF-HSDPA may thus provide advantages of parallel data streams like MIMO where the spatially separated antennas are taken from different sectors/cells.

When MF-HSDPA is used to transmit transport data blocks from different base stations to a wireless terminal during a same time resource element (also referred to as a transmission time interval or TTI), neither base station may be aware of how many transport data blocks were transmitted by the other base station. Accordingly, it may be difficult to provide efficient feedback from the wireless terminal to the network regarding the transport data blocks of a multi-flow transmission.

SUMMARY

It may therefore be an object to address at least some of the above mentioned disadvantages and/or to improve performance in a wireless communication system.

According to a first embodiment, a method is provided to communicate in a wireless communication network including a plurality of base stations supporting multi-flow downlink transmissions. At least one transport data block is transmitted from a first sector of the network over a downlink to a wireless terminal during a time resource element for a multi-flow downlink transmission to the wireless terminal, and at least one transport data block is transmitted from a second sector of the network over a downlink to the wireless terminal during the time resource element for the multi-flow downlink transmission. A feedback message for the time resource element is received from the wireless terminal with the feedback message including a Hybrid Automatic Repeat Request Acknowledge (HARQ-ACK) codeword selected from a HARQ-ACK codebook providing HARQ-ACK feedback for the at least one transport data block transmitted from the first sector and for the at least one transport data block transmitted from the second sector. The HARQ-ACK codeword is interpreted for the at least one transport data block transmitted from the first sector based on the first sector being a primary sector (also referred to as a serving sector/cell) for the multi-flow downlink transmission, and the HARQ-ACK codeword is interpreted for the at least one transport data block transmitted from the second sector based on the second sector being a secondary sector (also referred to as an assisting sector/cell) for the multi-flow downlink transmission. Whether to retransmit one or more of the at least one transport data block transmitted from the first sector is determined responsive to interpreting the HARQ-ACK codeword for the at least one transport data block transmitted from the first sector, and whether to retransmit one or more of the at least one transport data block transmitted from the second sector is determined responsive to interpreting the HARQ-ACK codeword for the at least one transport data block transmitted from the second sector.

By separately interpreting the HARQ-ACK codeword for the different data blocks transmitted from the different sectors for the multi-flow downlink transmission, a same codeword may be used for multiple data blocks transmitted from multiple cells/sectors of a same intra-node and/or inter-node multi-flow transmission. A reduced HARQ-ACK codebook may thus be used allowing increased Hamming distances between codewords. Accordingly, a likelihood of misinterpreting HARQ-ACK codewords may be reduced.

According to a second embodiment, a network node is provided in a wireless communication network supporting multi-flow downlink transmissions. The network node includes a first transceiver configured to provide communications in a first sector, a second transceiver configured to provide communications in a second sector adjacent to the first sector, and a processor coupled to the first and second transceivers. The processor is configured to transmit at least one transport data block through the first transceiver to the first sector over a downlink to a wireless terminal during a time resource element for a multi-flow downlink transmission to the wireless terminal, to transmit at least one transport data block through the second transceiver to the second sector over a downlink to the wireless terminal during the time resource element for the multi-flow downlink transmission, to receive a feedback message for the time resource element from the wireless terminal through at least one of the first transceiver and/or the second transceiver wherein the feedback message includes a Hybrid Automatic Repeat Request Acknowledge (HARQ-ACK) codeword selected from a HARQ-ACK codebook providing HARQ-ACK feedback for the at least one transport data block transmitted from the first sector and for the at least one transport data block transmitted from the second sector, to interpret the HARQ-ACK codeword for the at least one transport data block transmitted from the first sector based on the first sector being a primary sector for the multi-flow downlink transmission, and to determine whether to retransmit one or more of the at least one transport data block transmitted to the first sector responsive to interpreting the HARQ-ACK codeword.

According to a third embodiment, a method is provided to operate a wireless terminal communicating in a wireless communication network including a plurality of base stations supporting multi-flow downlink communications. At least one transport data block is received from a first sector of the wireless communication network during a time resource element for a multi-flow downlink communication, and at least one transport data block is received from a second sector of the wireless communication network during the time resource element for the multi-flow downlink communication. A feedback message is prepared including a hybrid automatic repeat request acknowledgement, (HARQ-ACK) codeword from a HARQ-ACK codebook with at least one codeword from the HARQ-ACK codebook having different interpretations for the at least one transport data block from the first sector and for the at least one transport data block from the second sector based on the first sector being a primary sector for the multi-flow downlink communication and the second sector being a secondary sector for the multi-flow downlink communication. The feedback message is transmitted to the first and second sectors.

According to a fourth embodiment, a wireless terminal is provided to communicate in a wireless communication network including a plurality of base stations supporting multi-flow downlink communications. The wireless terminal includes a transceiver configured to provide communications with the wireless communication network, and a processor coupled to the transceiver. The processor is configured to receive at least one transport data block from a first sector of the wireless communication network during a time resource element for a multi-flow downlink communication, to receive at least one transport data block from a second sector of the wireless communication network during the time resource element for the multi-flow downlink communication, to prepare a feedback message including a hybrid automatic repeat request acknowledgement (HARQ-ACK) codeword from a HARQ-ACK codebook with at least one codeword from the HARQ-ACK codebook having different interpretations for the at least one transport data block from the first sector and for the at least one transport data block from the second sector based on the first sector being a primary sector for the multi-flow downlink communication and the second sector being a secondary sector for the multi-flow downlink communication, and to transmit the feedback message to the first and second sectors.

According to a fifth embodiment, a method is provided to operate a network node (e.g., a base station) in a wireless communication network including a plurality of base stations supporting multi-flow downlink transmissions. At least one transport data block is transmitted from a sector/cell over a downlink to a wireless terminal during a time resource element, and a feedback message for the time resource element is received from the wireless terminal with the feedback message corresponding to the at least one transport data block transmitted during the time resource element. The feedback message is interpreted based on a number of the at least one transport data block transmitted from the sector/cell over the downlink to the wireless terminal during the time resource element, and whether retransmission of one or more of the at least one transport data block is required is determined responsive to interpreting the feedback message.

According to a sixth embodiment, a method is provided in a network node in a wireless communication system to interpret a codeword in a feedback message for a downlink transmission received from a wireless terminal in response to a data transmission from the network node to the wireless terminal. The method includes selecting a first interpretation for the codeword if the data transmission was a single stream data transmission from the network node and selecting a second interpretation for the codeword if the data transmission was a dual stream data transmission from the network node. The network node, for example, is a base station, a NodeB or an eNodeB that supports multi-flow downlink transmissions. Whether retransmission of one or more of the at least one transport data block is required may be determined responsive to selecting the first interpretation or the second interpretation of the codeword in the feedback message.

According to some aspects of the seventh embodiment, the feedback message has an HS-DPCCH format, and the feedback message includes a HARQ-ACK message selected from a codebook of HARQ-ACK messages stored in base station memory. At least one HARQ-ACK message from the codebook has at least two different interpretations depending on whether single stream transmission or multi-stream (e.g., dual stream) transmission was used, e.g., depending on whether the one or two transport data blocks were transmitted from the sector/cell to the wireless terminal during the time resource element. For example, the HARQ-ACK codeword "1010011001" for single stream transmission is interpreted as an acknowledgement for a single transport data block transmitted from a primary sector/cell when only one transport data block was transmitted from the primary sector/cell during the time resource element, or for dual stream transmission as an acknowledgement for two transport data blocks transmitted from the primary sector/cell when two transport data blocks were transmitted from the primary sector/cell during the time resource element. Furthermore, the HARQ-ACK codeword "1010011001" for single stream transmission is interpreted as a negative acknowledgement for a single transport data block transmitted from a secondary sector/cell when only one transport data block was transmitted from the secondary sector/cell during the time resource element, or for dual stream transmission as a negative acknowledgement for two transport data blocks transmitted from the secondary sector/cell when two transport data blocks were transmitted from the secondary sector/cell during the time resource element.

According to still other aspects of the seventh embodiment, the HARQ-ACK codeword "1001010110" (referring to codebook entry 9 of FIG. 8) for single stream transmission, for example, is interpreted as an acknowledgement for a single transport data block transmitted from a primary sector/cell when only one transport data block was transmitted from the primary sector/cell during the time resource element, or for dual stream transmission as an acknowledgement for a first transport data block and an acknowledgement for a second transport data block transmitted from the primary sector/cell when two transport data blocks were transmitted from the primary sector/cell during the time resource element. According to another example, the HARQ-ACK codeword "1001010110" (referring to codebook entry 9 of FIG. 8) for single stream transmission is interpreted as an acknowledgement for a single transport data block transmitted from a secondary sector/cell when only one transport data block was transmitted from the secondary sector/cell during the time resource element, or for dual stream transmission as an acknowledgement for two transport data blocks transmitted from the secondary sector/cell when two transport data blocks were transmitted from the secondary sector/cell during the time resource element.

According to an eighth embodiment, a method is provided to operate a network node (e.g., a base station) in a wireless communication network including a plurality of base stations supporting multi-flow downlink transmissions. The method includes transmitting a first transport data block from a sector/cell over a downlink to a wireless terminal during a first time resource element to provide a single stream downlink transmission during the first time resource element, and receiving a first feedback message including a codeword for the first time resource element from the wireless terminal wherein the first feedback message including the codeword corresponds to the first transport data block transmitted during the first time resource element. The codeword is interpreted to have a first meaning responsive to the single stream downlink transmission during the first time resource element, and whether retransmission of the first transport data block is required is determined responsive to the first meaning of the codeword. Second and third transport data blocks are transmitted from the sector/cell over a downlink to the wireless terminal during a second time resource element to provide a dual stream downlink transmission during the second time resource element. A second feedback message including the codeword for the second time resource element is received from the wireless terminal with the second feedback message including the codeword corresponding to the second transport data block transmitted during the second time resource element. More particularly, the codeword for the first and second time resource elements is the same codeword. The codeword is interpreted to have a second meaning different than the first meaning responsive to the dual stream downlink transmission during the second time resource element, and whether retransmission of the second and/or third transport data block is required is determined responsive to the second meaning of the codeword.

According to a ninth embodiment, a method is provided to operate a wireless terminal communicating in a wireless communication network including a plurality of base stations. The method includes receiving multi-flow downlink transmissions including a plurality of transport data blocks from different sectors/cells of the same or different base stations during a time resource element. A feedback message is prepared including an acknowledgement codeword from an acknowledgement codebook with at least one codeword from the acknowledgement codebook having two interpretations depending on whether one or two transport data blocks are received from one of the sectors/cells. The feedback message is transmitted to the different sectors/cells.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIGS. 2A, 2B, 2C, and 2D are block diagrams respectively illustrating a base station, a base station controller, a radio network controller, and a wireless terminal according to some embodiments of FIGS. 1A and/or 1B;

FIG. 4 is a block diagram illustrating an HS-DPCCH slot format including 3 slots with 10 bits per slot;

FIGS. 5A, 5B, 5C, and 5D are tables illustrating codewords for HARQ-ACK/NACK/DTX reporting according to some embodiments;

FIGS. 6A and 6B together provide a table illustrating a codebook of codewords for HARQ-ACK/NACK/DTX reporting according to some embodiments;

FIG. 7 is a table illustrating codewords for HARQ-ACK/NACK/DTX reporting according to some other embodiments;

FIG. 8 is a table illustrating a codebook of codewords for HARQ-ACK/NACK/DTX reporting according to some other embodiments;

FIG. 12 is a table illustrating a reduced codebook based on codebook entries 1-2, 5-6, and 9-12 of FIG. 8 according to some embodiments.

DETAILED DESCRIPTION

Figure 1A:
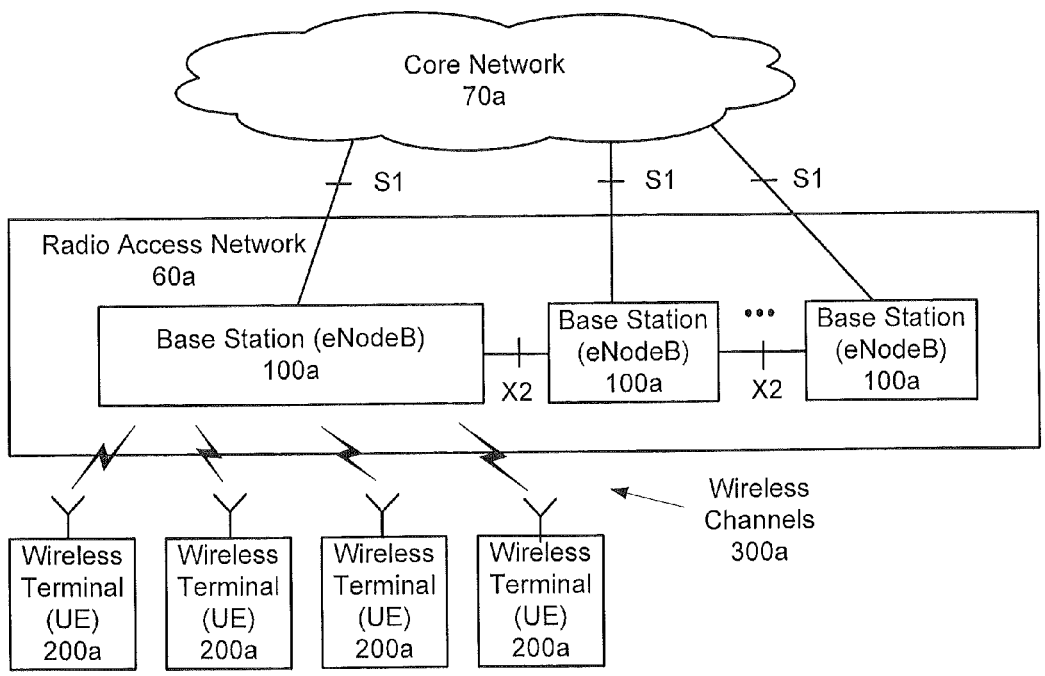
FIGS. 1A and 1B are block diagrams of communications systems that are configured according to some embodiments.

Embodiments of inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of the present inventive concepts to those skilled in the art. It should also be noted that these embodiments are not mutually exclusive. Components from one embodiment may be tacitly assumed to be present/used in another embodiment.

For purposes of illustration and explanation only, these and other embodiments of the inventive concepts are described herein in the context of operating in a RAN that communicates over radio communication channels with wireless terminals (also referred to as UEs). It will be understood, however, that the present inventive concepts are not limited to such embodiments and may be embodied generally in any type of communication network. As used herein, a wireless terminal (also referred to as a UE) can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controller is typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the NodeB's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from HSDPA (High-Speed Downlink Packet Access) and/or WCDMA (Wideband Code Division Multiple Access) is used in this disclosure to exemplify embodiments of inventive concepts, this should not be seen as limiting the scope of inventive concepts to only these systems. Other wireless systems, including WiMax (Worldwide Interoperability for Microwave Access), UMB (Ultra Mobile Broadband), 3GPP ($3^{rd}$ Generation Partnership Project) LTE (Long Term Evolution), GSM (Global System for Mobile Communications), etc., may also benefit from exploiting embodiments of inventive concepts disclosed herein.

Also note that terminology such as base station (e.g., a NodeB and/or eNodeB) and wireless terminal (also referred to as UE or User Equipment) should be considering non-limiting and does not imply a certain hierarchical relation between the two. In general a base station (e.g., a NodeB and/or eNodeB) and a wireless terminal (e.g., a "UE") may be considered as examples of respective different communications devices that communicate with each other over a wireless radio channel. While embodiments discussed herein may focus on wireless transmissions in a downlink from an NodeB/eNodeB to a UE, embodiments of inventive concepts may also be applied, for example, in the uplink.

FIG. 1A is a block diagram of a communication system that is configured to operate according to some embodiments of inventive concepts. An example RAN 60 is shown that may be a Long Term Evolution (LTE) RAN. Radio base stations (e.g., eNodeBs) 100a are connected directly to one or more core networks 70a. In some embodiments, functionality of radio network controller(s) (RNC) 100a may be performed by radio base stations 100a. Radio base stations 100a communicate over wireless channels 300 with wireless terminals (also referred to as user equipment nodes or UEs) 200a that are within their respective communication service cells (also referred to as coverage areas). The radio base stations 100a may be eNodeB's that may communicate with one another through an X2 interface(s) and with the core network(s) 70a through S1 interfaces, as is well known to one who is skilled in the art.

Figure 1B:
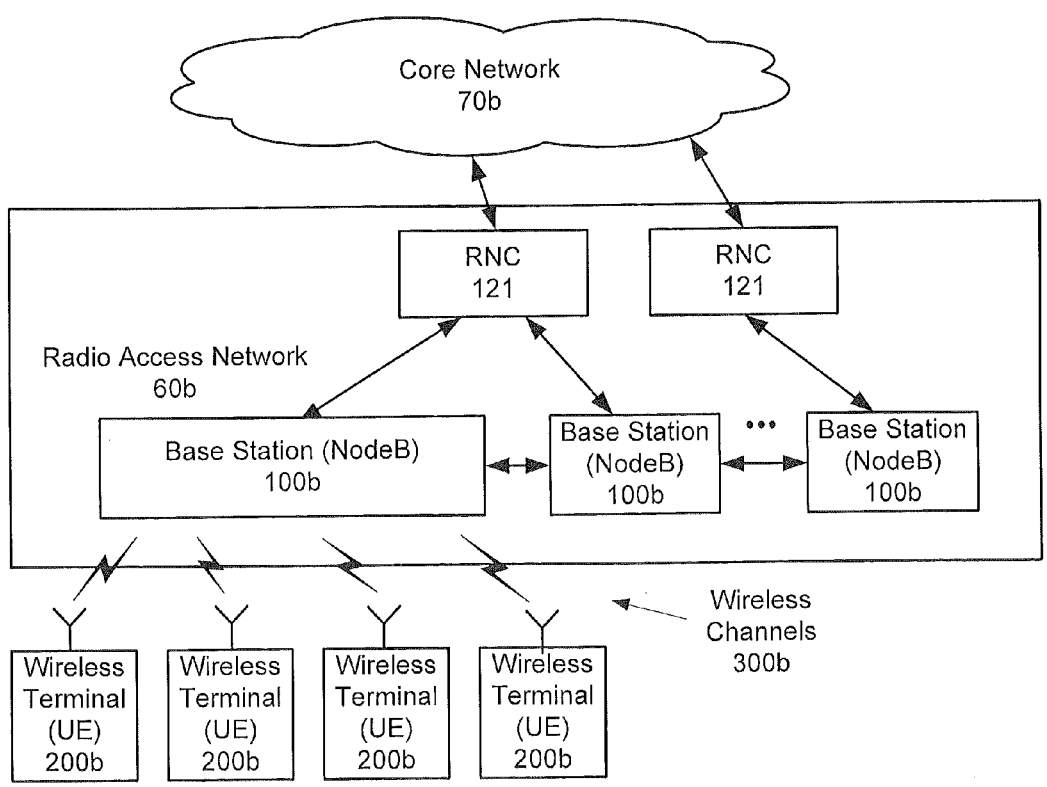

FIG. 1B is a block diagram of a communication system that is configured to operate according to some other embodiments of present inventive concepts. An example RAN 60b is shown that may be a WCDMA RAN. Radio base stations (e.g., NodeBs) 100b may be coupled to core network(s) 70b through one or more radio network controllers (RNCs) 65b. In some embodiments, functionality of a radio network controller(s) may be performed by radio base stations 100b. Radio base stations 100b communicate over wireless channels 300b with wireless terminals (also referred to as user equipment nodes or UEs) 200b that are within their respective communication service cells (also referred to as coverage areas). The radio base stations 100b can communicate with one another and with the core network(s) 70b, as is well known to one who is skilled in the art.

Figure 2A:
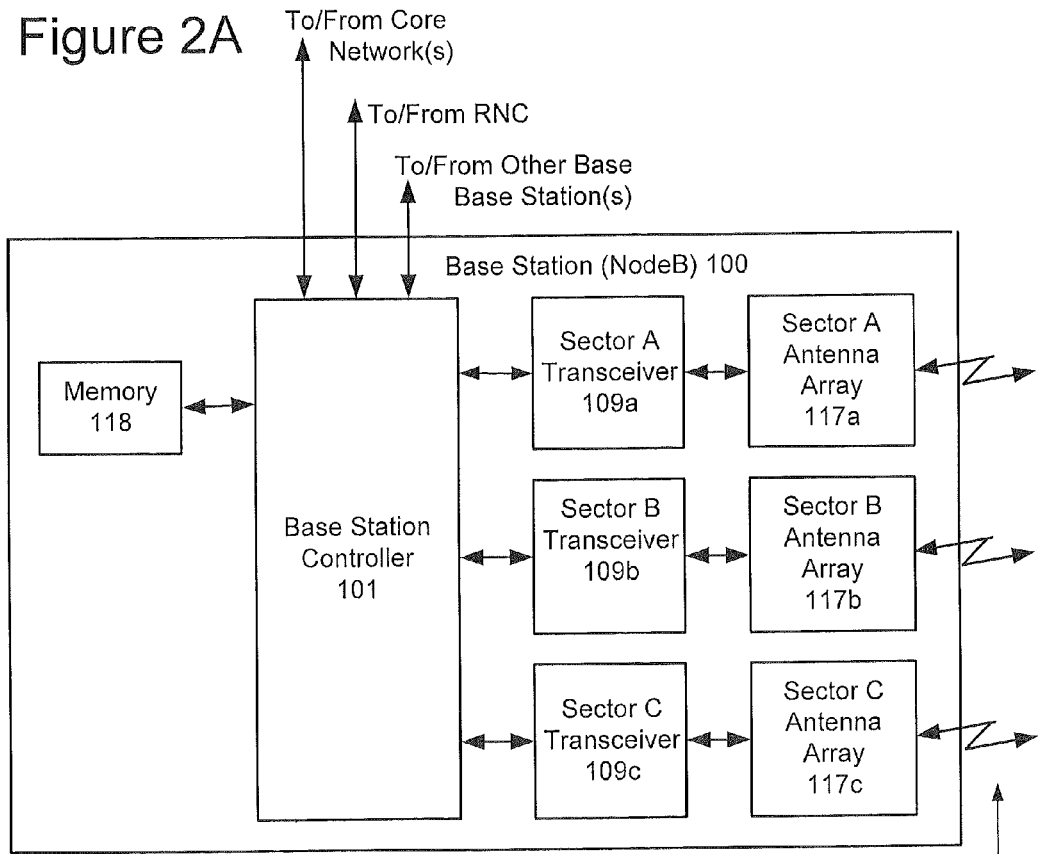

FIG. 2A is a block diagram of a base station 100 (e.g., base station 100a of FIG. 1A or base station 100b of FIG. 1B) configured to provide service over three 120 degree sectors (sectors A, B, and C) surrounding the base station according to some embodiments. As shown, for example, base station 100 includes three transceivers 109a, 109b, and 109c coupled between base station controller 101 and respective sector antenna arrays 117a, 117b, and 117c (each of which includes multiple MIMO antennas), and memory 118 coupled to processor 101.

More particularly, each transceiver 109 includes a receiver and a transmitter. Each receiver is configured to generate digital data streams corresponding to one or more transport data blocks received through the respective sector antenna array 117 from wireless terminals 200 located in a sector serviced by the respective sector antenna array. Each transmitter is configured to transmit one or more transport data blocks through the respective sector antenna array 117 to wireless terminals 200 located in the sector serviced by the sector antenna array responsive to a digital data stream from processor 101. For example, base station 100 of FIG. 1 defines three 120 degree sectors A, B, and C surrounding the base station, transceiver 109a and sector antenna array 117a support MIMO communications for wireless terminals 200 in sector A of base station 100, transceiver 109b and sector antenna array 117b support MIMO communications for wireless terminals 200 in sector B of base station 100, and transceiver 109c and sector antenna array 117c support MIMO communications for wireless terminals 200 in sector C of base station 100.

Figure 2B:
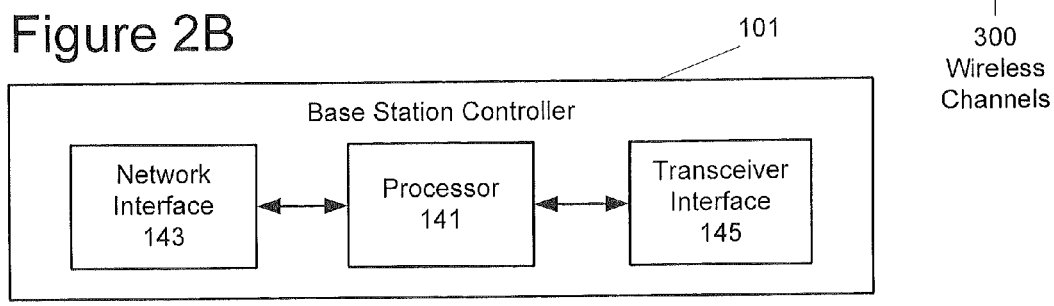

FIG. 2B is a block diagram of base station controller 101 of FIG. 2A according to some embodiments. As shown, for example, base station controller 101 includes processor 141, network interface 143, and transceiver interface 145. Network interface 143 provides a communications interface between processor 141 and core network 70, between processor 141 and RNC 121, and/or between processor 141 and other base stations 100. Transceiver interface 145 is configured to provide a communications interface between processor 141 and each of transceivers 109a, 109b, and 109c.

Figure 2C:
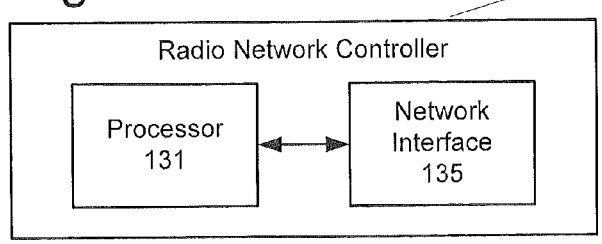

FIG. 2C is a block diagram of radio network controller (RNC) 121 of FIG. 1B according to some embodiments. As shown, for example, RCN 121 includes processor 131 and network interface 135. Network interface 143 provides a communications interface between processor 131 and base stations 100 and/or between processor 131 and core network 70.

FIG. 2D is a block diagram of a wireless terminal (UE) 200 (e.g., wireless terminal 200a of FIG. 1A or wireless terminal 200b of FIG. 1B) according to some embodiments. Wireless terminal 200, for example, may be a cellular radiotelephone, a smart phone, a laptop/netbook/tablet/handheld computer, or any other device providing wireless communications. Wireless terminal 200, for example, includes processor 201, user interface 211 (e.g., including a visual display such as an liquid crystal display, a touch sensitive visual display, a keypad, a speaker, a microphone, etc.), memory 218, transceiver 209, and sector antenna array 217 (including a plurality of antenna elements). Moreover, transceiver 209 includes a receiver allowing processor 201 to receive data from radio access network 60 over one or more wireless channels 300 through sector antenna array 217 and transceiver 209, and transceiver 209 includes a transmitter allowing processor 201 to transmit data through transceiver 209 and sector antenna array 217 over one or more wireless channels 300 to radio access network 60.

By providing a plurality of antenna elements in sector antenna array 217, wireless terminal 200 can receive MIMO communications allowing spatial multiplexing and/or diversity gain as discussed above. A maximum number of downlink MIMO channels that can be received simultaneously during multi-flow and/or single-flow MIMO by wireless terminal 200, however, is equal to the number of antenna elements included in antenna array 217. According to some embodiments, wireless terminal antenna array 217 includes two antenna elements, and wireless terminal 200 is thus limited to receiving no more that 2 MIMO downlink steams simultaneously. According to some other embodiments, wireless terminal antenna array 217 may include four antenna elements, and wireless terminal 200 may be limited to receiving no more than 4 MIMO downlink streams simultaneously. During single-flow MIMO communications with wireless terminal antenna array 217 including 2 antenna elements, wireless terminal 200 can receive up to two MIMO downlink data streams simultaneously from a same sector antenna array of RAN. During single-flow MIMO communications with wireless terminal antenna array 217 including 4 antenna elements, wireless terminal 200 can receive up to four MIMO downlink data streams simultaneously from a same sector antenna array of RAN 60. During multi-flow MIMO communications with wireless terminal antenna array 217 including 2 antenna elements, wireless terminal 200 can receive a first MIMO downlink data stream from a first sector antenna array of RAN 60 and a second MIMO downlink data stream from a second sector antenna array of RAN 60 of a same base station or of different base stations. During multi-flow MIMO communications with wireless terminal antenna array 217 including four antenna elements, wireless terminal 200 can receive first and second MIMO downlink data stream from a first sector antenna array of RAN 60 and third and fourth MIMO downlink data stream from a second sector antenna array of RAN 60; wireless terminal 200 can receive one MIMO downlink data stream from a first sector antenna array of RAN 60 and up to three MIMO downlink data streams from a second sector antenna array of RAN 60; wireless terminal 200 can receive one MIMO downlink data stream from a first sector antenna array of RAN 60 and two MIMO downlink data stream from a second sector antenna array of RAN 60; etc.

In a downlink direction, RNC 121 (or processor 131 thereof) can split out different downlink data streams from core network 70 to respective base stations 100 for transmission to wireless terminals 200 in communication with the respective base stations 100. For downlink data streams received at a particular base station 100, the base station controller 101 (or processor 141 thereof) can split out different ones of the downlink data streams for transmission through the transceivers and sector antenna arrays of the respective sectors A, B, and C to wireless terminals 200 communicating through the respective sectors of the base station.

In an uplink direction, base station controller 101 (or processor 141 thereof) can combine the different uplink data streams received through the sector antenna arrays of sectors A, B, and C. Similarly, RNC 121 (or processor 135 thereof) can combine the uplink data streams from the different base stations 100, and transmit the combined uplink data streams to core network 70.

A downlink data stream for a particular wireless terminal 200 can thus include a plurality of transport data blocks provided from core network 70 through radio network controller 121, through base station controller 101 of the base station 100 with which the wireless terminal 200 is communicating, and through the transceiver 109 and sector antenna array 117 for the sector in which the wireless terminal 200 is located. For every transport data block received at RNC 121, processor 131 of RNC 121 directs the downlink transport data block to a respective base station 100, and for every transport data block 117 received at a base station 100, processor 141 of base station controller 101 directs the downlink transport data block to a respective transceiver and sector antenna array for transmission over the appropriate sector.

When a wireless terminal is located in a border area between two sectors, transport data blocks from the same downlink stream (e.g., supporting a radiotelephone voice communication between the wireless terminal and another communication device, supporting a data communication between the wireless terminal and a remote server, etc.) can be transmitted from sector antenna arrays of the two different sectors to the wireless terminal to provide increased throughput using multi-flow communications (e.g., using MF-HSDPA). If the two different sectors are co-located at a same base station, processor 141 of base station controller 101 can split the transport data blocks of the downlink data stream to the different transceivers 109 supporting the different sectors to provide intra node aggregation as discussed in greater detail below with respect to FIG. 3A. If the two different sectors are located at different base stations, processor 131 of RNC 121 can split the transport data blocks of the downlink data stream to the different base stations 100 supporting the different sectors to provide inter node aggregation as discussed in greater detail below with respect to FIG. 3B.

Figure 3A:
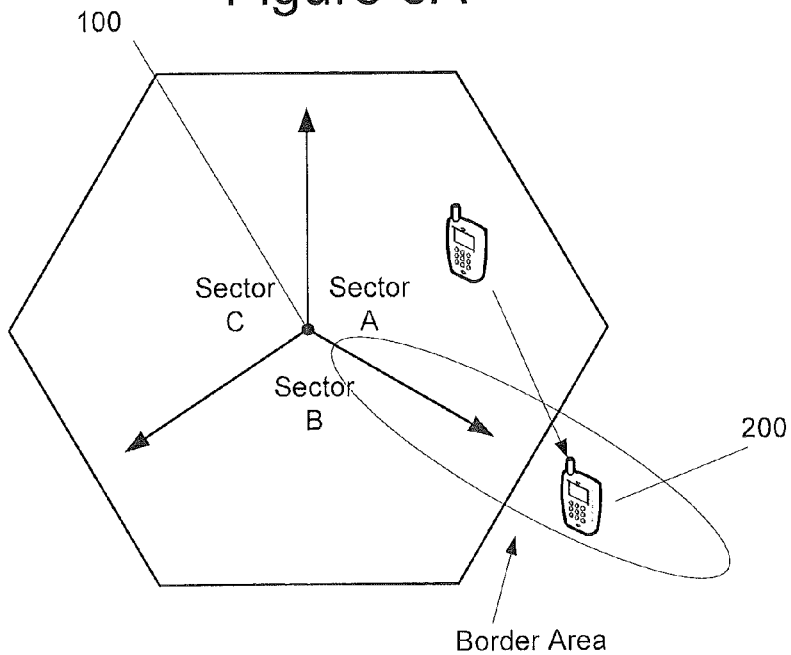
FIGS. 3A and 3B are schematic diagrams respectively illustrating intra node and inter node Multi-Flow communications according to some embodiments.

As shown in embodiments of FIG. 3A, base station 100 of FIG. 2A supports communications with wireless terminals in three different 120 degree sectors A, B, and C. More particularly, transceiver 109a and sector antenna array 117a support MIMO communications with wireless terminals located in Sector A, transceiver 109b and sector antenna array 117b support MIMO communications with wireless terminals located in Sector B, and transceiver 109c and sector antenna array 117c support MIMO communications with wireless terminals located in Sector C. Stated in other words, each of sector antenna arrays 117a, 117b, and 117c (together with respective transceivers 109a, 109b, and 109c) defines a respective 120 degree sector A, B, and C. When wireless terminal 200 is initially located in a central portion of sector A as shown in FIG. 3A, RAN 60 provides wireless communications for a downlink data stream (made up of transport data blocks) by transmitting transport data blocks of the downlink data stream through transceiver 109a and sector antenna array 117a over a wireless channel 300 to wireless terminal 200.

When wireless terminal 200 moves from a central portion of sector A to a border area between sectors A and B as indicated by the arrow in FIG. 3A, intra node Multi-Flow communications are be used to transmit different transport data blocks of the downlink data stream in parallel through transceiver 109a and sector antenna array 117a and through transceiver 109b and sector antenna array 117b to wireless terminal 200 (e.g., using MF-HSDPA). With single stream transmission from both sectors, different first and second transport data blocks of the same data stream are respectively transmitted from sector antenna arrays 117a and 117b using a same time/frequency resource element (TFRE) to increase downlink throughput for the wireless terminal in the border area (also referred to as a soft handover region). As used herein, a time/frequency resource element may also be referred to as a transmission time interval or TTI. With dual stream transmission from both sectors, first and second transport data blocks are transmitted from sector antenna array 117a and third and fourth transport data blocks are transmitted from sector antenna array 117b using a same TFRE. With dual stream transmission from one of the sectors and single stream transmission from the other of the sectors, first and second transport data blocks are transmitted from one sector antenna array and a third transport data block is transmitted from the other sector antenna array using a same TFRE.

When wireless terminal 200 is in a border area between two sectors A and B of the same base station 100 as shown in FIG. 3A, all transport data blocks for the data stream to the wireless terminal 200 are processed through a single base station controller 101 where the decision is made for each transport data block of the data stream whether to transmit through sector antenna array 117a or 117b. Stated in other words, only one Radio Link Control (RLC) flow is required for the data stream with the data split being performed at a Media Access Control (MAC) layer using processor 141 of base station controller 101. With intra node Multi-Flow communications as shown in FIG. 3A, the data split can be transparent with respect to RNC 121.

When wireless terminal 200 moves from a central portion of sector A to a border area between sectors A and B, processor 141 of base station controller 101 may decide whether to provide Multi-Flow communications for wireless terminal 200. As discussed, for example, in co-pending U.S. patent application Ser. No. 13/328,139 (entitled "Methods Providing Multiflow Communications Based on Sector Loads and Related Network Nodes") to Nammi et al., filed Dec. 16, 2011, and assigned to the assignee of the present application, the decision to provide Multi-Flow communications may be based on a communication load(s) in sector A and/or sector B. Operations to provide Single-Flow and Multi-Flow communications for wireless terminal 200 moving between central portions of Sector A and a border area between sectors A and B of FIG. 3A are discussed, for example, in co-pending U.S. Patent Application No. 61/591,307 (entitled "Methods For Selecting Precoding Vectors For Multi-Point MIMO (Multiple-Input-Multiple Output) Communications And Related Wireless Terminals And Radio Network Nodes") to Nammi et al., filed Jan. 27, 2012, and assigned to the assignee of the present application.

Figure 3B:
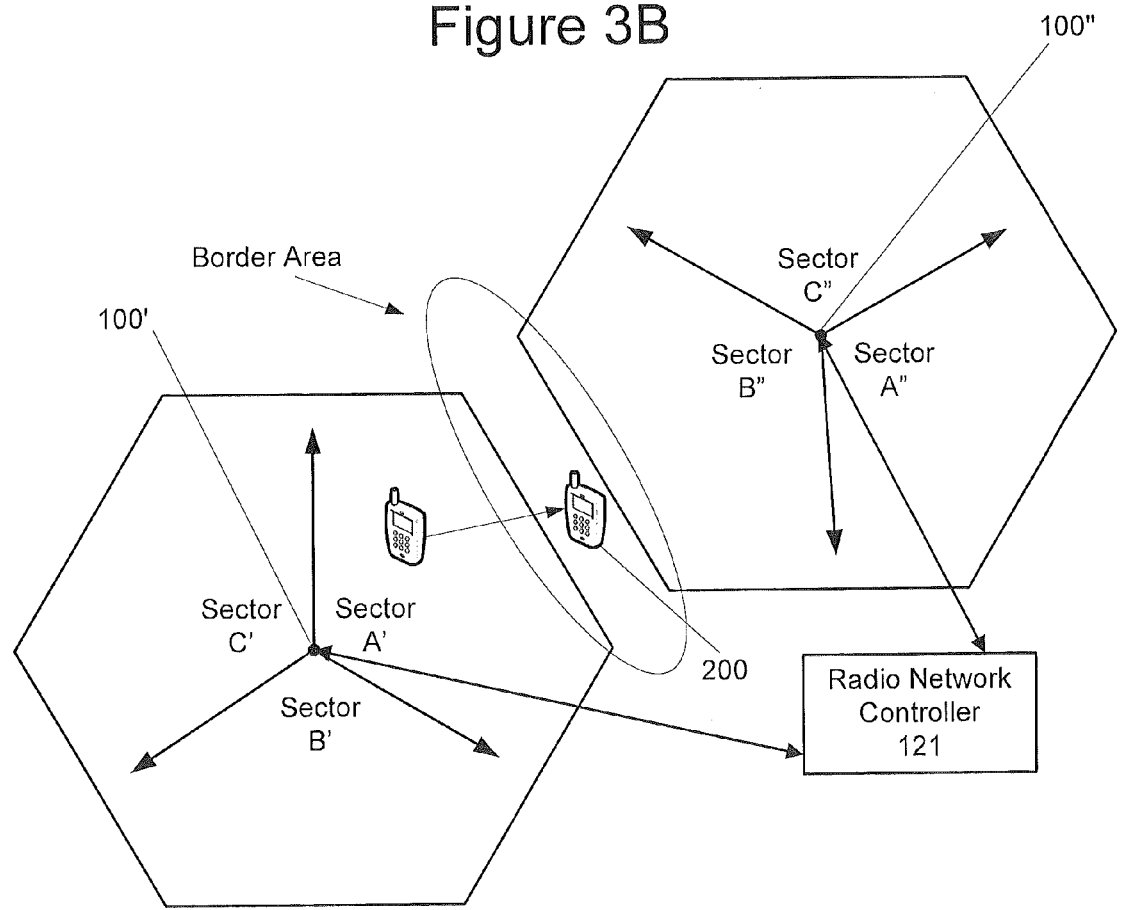

As shown in embodiments of FIG. 3B, two base stations, identified as base stations 100' and 100", support communications with wireless terminals, with each of base stations 100' and 100" separately having the structure of FIG. 2A (using prime and double prime notation to separately identify elements of the different base stations 100' and 100"). In addition, each base station 100' and 100" is coupled to RNC 121. Moreover, base station 100' supports MIMO communications with wireless terminals located in 120 degree sectors A', B', and C' surrounding base station 100', and base station 100" supports MIMO communications with wireless terminals located in 120 degree sectors A", B", and C" surrounding base station 100". More particularly, transceiver 109a' and sector antenna array 117a' support MIMO communications with wireless terminals located in Sector A', transceiver 109b' and sector antenna array 117b' support MIMO communications with wireless terminals located in Sector B', and transceiver 109c' and sector antenna array 117c' support MIMO communications with wireless terminals located in Sector C'. Similarly, transceiver 109a" and sector antenna array 117a" support MIMO communications with wireless terminals located in Sector A", transceiver 109b" and sector antenna array 117b" support MIMO communications with wireless terminals located in Sector B", and transceiver 109c" and sector antenna array 117c" support MIMO communications with wireless terminals located in Sector C". When wireless terminal 200 is initially located in a central portion of sector A' as shown in FIG. 3B, RAN 60 provides wireless communications for a downlink data stream made up of transport data blocks by transmitting the downlink data stream through transceiver 109a' and sector antenna array 117a' over a wireless channel 300 to wireless terminal 200.

When wireless terminal 200 moves from a central portion of sector A' to a border area between sectors A' and B" (of different base stations 100' and 100") as indicated by the arrow in FIG. 3B, inter node Multi-Flow communications can be used to transmit different transport data blocks of the downlink data stream in parallel through transceiver 109a' and sector antenna array 117a' of base station 100' and through transceiver 109b" and sector antenna array 117b" of base station 100" to wireless terminal 200 (e.g., using MF-HSDPA). With single stream downlink transmission from both sectors, different first and second transport data blocks of the same data stream are respectively transmitted from sector antenna arrays 117a' and 117b" using a same time/frequency resource element (TFRE) to increase downlink throughput for the wireless terminal in the border area (also referred to as a soft handover region). With dual stream transmission from both sectors, first and second transport data blocks are transmitted from sector antenna array 117a' and third and fourth transport data blocks are transmitted from sector antenna array 117b" using a same TFRE. With dual stream transmission from one of the sectors and single stream transmission from the other of the sectors, first and second transport data blocks are transmitted from one sector antenna array and a third transport data block is transmitted from the other sector antenna array using a same TFRE. According to other embodiments, Multi-Flow communications are used to transmit the same transport data block from sector antenna arrays 117a' and 117b" using a same TFRE to provide increased reliability of reception due to diversity gain.

When wireless terminal 200 is in a border area between two sectors A' and B" of different base stations 100' and 100" according to embodiments shown in FIG. 3B, all transport data blocks for the data stream to the wireless terminal 200 are processed through a single radio network controller (RNC) 121 where the decision is made by processor 131 for each transport data block of the data stream whether to transmit through sector antenna array 117a' of base station 100' or sector antenna array 117b" of base station 100". Even though transport data blocks of the data stream are transmitted from sector antenna arrays 117a' and 117b" using a same TFRE, timing mismatch may occur because schedulers of base stations 100' and 100" act independently and/or because transmission delays between wireless terminal 200 and base stations 100' and 100" are different (due to different distances between wireless terminal 200 and base stations 100' and 100").

When wireless terminal 200 moves from a central portion of sector A' to a border area between sectors A' and B", processor 131 of radio network controller 121 decides whether to provide Multi-Flow communications based on a load of sector B". As discussed, for example, in U.S. patent application Ser. No. 13/328,139 (entitled "Methods Providing Multiflow Communications Based on Sector Loads and Related Network Nodes") to Nammi et al. and filed Dec. 16, 2011, the decision to provide Multi-Flow communications can be based on a communication load in sector A' and/or sector B". Operations to provide Single-Flow and Multi-Flow communications to wireless terminal 200 moving between central portions of Sector A' and a border area between sectors A' and B" of FIG. 3B are discussed, for example, in co-pending U.S. Patent Application No. 61/591,307 (entitled "Methods For Selecting Precoding Vectors For Multi-Point MIMO . . . Communications And Related Wireless Terminals And Radio Network Nodes") to Nammi et al., filed Jan. 27, 2012, and assigned to the assignee of the present application.

When using either inter or intra node MF-HSDPA Multi-Flow communications as discussed above with respect to embodiments of FIGS. 3A and 3B, the primary sector (also referred to as a serving cell/sector) antenna array (e.g., sector antenna array 117a or 117a') transmits transport data blocks for first data and control channels (e.g., a first high speed shared control channel or HS-SCCH and a first high speed physical downlink shared channel or HS-PDSCH) to wireless terminal 200, and the secondary sector (also referred to as an assisting cell/sector) antenna array (e.g., sector antenna array 117b or 117b") transmits transport data blocks for second data and control channels (e.g., a second high speed shared control channel or HS-SCCH and a second high speed physical downlink shared channel or HS-PDSCH) to wireless terminal 200. In the opposite direction, wireless terminal 200 transmits a high speed dedicated physical control channel (HS-DPCCH) that is received by both primary and secondary sector antenna arrays.

A work item on multi-flow (MF) HSDPA (High Speed Downlink Packet Access) was started at RAN#53 plenary, enabling a UE (User Equipment, also referred to as a mobile and/or wireless terminal) to simultaneously receive data streams from multiple base station (also referred to as a NodeB and/or eNodeB) sectors using a same time-frequency-resource-element (TFRE). In contrast to the multi-carrier features previously specified within 3GPP ($3^{rd}$ Generation Partnership Project), where all transmissions to a UE are transmitted from a same base station sector, a multi-flow UE can simultaneously receive data from different base station sectors (using a same TFRE) possibly belonging to different base station sites. By simultaneously transmitting independent transport data blocks from different sectors/cells using a same TFRE, user data rates in softer and soft handover (SHO) regions can be improved. It was agreed during RAN1#68 to employ a single HS-DPCCH (High Speed Dedicated Physical Control Channel), both for intra- and inter-NodeB MF-HSDPA. However, structures for HARQ-ACK (Hybrid-Automatic-Repeat-Request-Acknowledge) and/or HARQ-NACK (Hybrid-Automatic-Repeat-Request-Negative-Acknowledge) reporting as well as details for CQI (Channel Quality Indicator) groupings may remain unresolved.

As agreed in RAN1, MF-HSDPA may be supported for the following configurations: (1) Two sectors/cells without MIMO (multiple-input-multiple-output) configured (SF-DC or Single-Frequency-Dual-Cell, no MIMO); (2) Two sectors/cells with MIMO configured (SF-DC, with MIMO); (3) Four sectors/cells without MIMO configured (DF-QC or Dual-Frequency-Quad-Cell, no MIMO); and (4) Four sectors/cells with MIMO configured (DF-QC, with MIMO).

It was further agreed during RAN1#68 to re-use the Dual-Carrier-HSDPA (DC-HSDPA) CQI formats for 2 sector/cell multi-flow operation and the Four-Carrier-HSDPA (4C-HSDPA) format for more than 2 cells. When designing the codebooks for DC-HSDPA and 4C-HSDPA, however, it was assumed that all cells reside in the same sector/cell and/or base station. This assumption may not necessarily be true in MF-HSDPA, as the cells can belong to different sectors which in turn can belong to different base station (e.g., NodeB and/or eNodeB) sites. In such scenarios, the different sites (e.g., different base stations, NodeBs, eNodeBs, etc.) may be unaware of schedules of the other site(s). Hence, care may need to be taken developing HARQ-ACK/NACK codebooks to be used for multi-flow. In the following disclosure, codebook designs are disclosed for the four supported configurations outlined above, and further codebook designs are disclosed for configurations with two sectors/cells and MIMO configured.

An issue related to MF-HSDPA is how the HARQ acknowledgment messages should be transmitted in the uplink from one UE to several cells/sectors or base stations (NodeBs). According to some embodiments, this information is carried on the HS-DPCCH.

The HS-DPCCH carries downlink related feedback information when HSDPA (High Speed Downlink Packet Access) is configured. This feedback information can include and/or consist of: HARQ-ACK messages whereby the UE can indicate whether the reception of packet(s) scheduled on the downlink was successful; and CQI whereby the UE informs the NodeB scheduler about the maximum transport data block size that it could receive with a 10 percent block error ratio (BLER).

FIG. 4 illustrates a structure of an HS-DPCCH sub-frame slot format according to some embodiments. The HARQ-ACK message is transmitted during the first slot (including 10 bits), and the encoded CQI information/message is transmitted during the last 2 slots of the sub-frame (including 20 bits). In Rel-5 to Rel-9, HS-DPCCH uses 1xSF256. Accordingly, $3.84 \cdot 10^6/1500/256=10$ bits are available in a slot. Consequently, HARQ-ACK information can be coded using 10 bits.

According to some embodiments, a design principle for MF-HSDPA HARQ-ACK codebooks may be to re-use existing multicarrier alternatives/codebooks. A difference between multicarrier operation and inter-cell (also referred to as inter-NodeB) MF-HSDPA is that for inter-cell MF-HSDPA configurations, each site may be unaware of schedules of other sites transmitting to the same UE using a same TFRE (e.g., the number of streams scheduled by the other site or sites). In general, multicarrier codebook design makes use of knowledge of a number of streams that are scheduled during a decoding process. Accordingly, directly applying multicarrier codebooks for MF-HSDPA may be difficult in some scenarios.

Some embodiments of inventive concepts may address HARQ-ACK designs for MF-HSDPA configurations with two cells/sectors and MIMO, a scenario where it can be difficult to directly re-use multicarrier codebooks due to issues noted above.

To introduce MF-HSDPA, a HARQ-ACK solution may be needed. According to some embodiments of inventive concepts, an SF256 (spreading factor 256, i.e. the HS-DPCCH may use a channelization code with spreading factor of 256) HARQ-ACK codebook solution is provided for MF-HSDPA with two cells and MIMO configured.

For a configuration with two sectors/cells each employing MIMO downlink transmission, a maximum of four streams may need to be acknowledged (i.e. one acknowledgment message for each stream and sector/cell). Three different HARQ-ACK messages are possible for each stream; ACK(A) or acknowledge, NACK(N) or negative acknowledge, and DTX(D) or discontinuous transmission. Each site (e.g., each base station, NodeB, eNodeB, etc.) can schedule one or two streams. Each base station or NodeB can use knowledge about the number of its own scheduled streams in the decoding process, but each base station and/or NodeB may be unaware of the number of streams scheduled by the other base station and/or NodeB in an inter-cell configuration. Two solutions for the HARQ-ACK design according to some embodiments are to: (1) use an SF128 solution similar to multicarrier Rel-10 where each site is coded independently using the Rel-8 codebook; and/or (2) use an SF256 solution similar to multicarrier Rel-9. Use of an SF256 solution may be desired because an SF256 solution may be more in line with the multicarrier evolution and, in general, an SF256 solution may provide improved performance relative to an SF128 solution.

A difference between MF-HSDPA and Rel-9 multicarrier is that, for inter-cell MF-HSDPA, each site and/or base station may be unaware of scheduling at the other base station and/or site transmitting to the same UE using a same TFRE. Accordingly, re-use of the Rel-9 multicarrier HARQ-ACK codebook directly for MF-HSDPA may be difficult, and a new codebook may need to be designed.

FIGS. 5A, 5B, 5C, and 5D provide tables showing different codeword combinations used in a decoding process for different scheduling options according to some embodiments of inventive concepts. In FIGS. 5A, 5B, 5C, 5D, 6A, and 6B, S1 denotes site 1; S2 denotes site 2; X/X represents single stream transmission from both cells/sectors A' and B" (e.g., from both radio base stations 100' and 100" for sectors/cells A' and B"); XX/X represents dual stream transmission from cell/sector A' (e.g., from radio base station 100' for sector/cell A') and single stream transmission from cell/sector B" (e.g., from radio base station 100" for sector/cell B"); X/XX represents single stream transmission from cell/sector A' (e.g., from radio base station 100' for sector/cell A') and dual stream transmission from cell/sector B" (e.g., from radio base station 100" for cell/sector B"); XX/XX represents dual stream transmission from both cells/sectors A' and B" (e.g., from radio base station 100' for sector/cell A', and from radio base station 100" for sector/cell B"). By exploring properties of the tables of FIGS. 5A, 5B, 5C, and 5D, a new codebook can be derived according to some embodiments of inventive concepts.

An example of a HARQ-ACK codebook according to some embodiments of inventive concepts is given in the table of FIGS. 6A and 6B, and the codebook of FIGS. 6A and 6B can be saved in memory 218 of each wireless terminal 200 and in memory 118 of each base station 100. In FIGS. 6A and 6B, A represents an ACK, N represents a NACK, and D represents a DTX. Design principles for the codebook of FIGS. 6A and 6B may include:

(1) Each site (e.g., each base station 100' and 100" and/or NodeB) can use information about how many of its own streams were scheduled in the decoding process (e.g., if an HS-SCCH or High-Speed-Shared-Control-Channel is detected, then the correct information will likely be decoded).

(a) Note that options that cell/sector A' of base station 100' (site-1) schedules one stream and that cell/sector A' of base station 100' (site-1) schedules two streams may use the same codeword (bit combination) to indicate different HARQ-ACK messages. By way of example: A/A and AA/AA (codebook entries 13 and 33 of FIGS. 6A and 6B) may use the same codeword (i.e., "0010100001"); A/N and NA/NN (codebook entries 14 and 44 of FIGS. 6A and 6B) may use the same codeword (i.e., "0111000110"); N/A and NA/NA (codebook entries 15 and 43 of FIGS. 6A and 6B) may use the same codeword (i.e., "1000111111"); and NN and AA/NA (codebook entries 16 and 35) may use the same code word (e.g., "1101001010"). Hence, the decoding process may need to take this into consideration by including the appropriate codewords in the decoding process. The appropriate codewords may depend on whether one or two streams were scheduled by the own cell (NodeB) as indicated in the tables of FIGS. 5A-D.

(b) Note that some codewords appear in several groups (see the tables of FIGS. 5A-D). For example, the codeword A/D appears in the three groups: site-1 (cell/sector A' of base station 100') schedules 1 stream; site-2 (cell/sector B" of base station 100") schedules 1 stream; and site-2 (cell/sector B" of base station 100") schedules 2 streams.

(2) All shadowed codewords in the tables of FIGS. 5A-D (corresponding to codebook entries 1-32 of FIGS. 6A and 6B) are taken from a common codebook with a minimum Hamming distance of four. Accordingly, every combination of shadowed codewords can have a minimum Hamming distance of at least four.

(3) The non-shadowed codewords in the table of FIG. 5 (corresponding to codebook entries 33-48 of FIGS. 6A and 6B) are taken from a common codebook with a minimum Hamming distance of three and with a minimum Hamming distance with respect to any of the shadowed codewords of at least three.

(4) Performance for single stream scheduling can be increased and/or maximized. A minimum Hamming distance for options when site-1 (cell/sector A' of base station 100') schedules one stream and site-2 (cell/sector B" of base station 100") schedules one stream may be four.

(5) A Hamming distance between N/A and A/A, between N/A and A/N, between N/A and A/D, between N/A and A/AA, between N/A and A/AN, between N/A and A/NA, and between N/A and A/NN can be six. Similarly, a Hamming distance between A/N and A/A, between A/N and N/A, between A/N and D/A, between A/N and AA/A, between A/N and AN/A, between A/N and NA/A, and between A/N and NN/A can be six. This Hamming distance may be beneficial because these error events may result in RLC (Radio Link Control) retransmissions. Also, the A/N or N/A codewords may be the most frequent "worst case" codewords (compared, for example, to N/N) because a typical network operates at a rather large ACK rate (e.g., 90% of all initial transmissions may be ACKed or acknowledged).

(6) A minimum Hamming distance for the options when site-1 (cell/sector A' of base station 100') schedules two streams and site-2 (cell/sector B" of base station 100") schedules two streams may be three.

(7) Legacy POST/PRE codewords may be supported. As used herein, POST is a POSTAMBLE codeword that may be transmitted before the actual acknowledgement codeword, and PRE is a PREAMBLE that may be transmitted after the actual acknowledgement codeword.

The tables of FIGS. 7A-D show different codeword combinations used in a decoding process for different scheduling options according to some other embodiments of inventive concepts. In the tables of FIGS. 7A-D, X/X represents single stream transmission from both cells/sectors A' and B" (e.g., from both radio base stations 100' and 100" for sectors/cells A' and B"); XX/X represents dual stream transmission from cell/sector A' (e.g., from radio base station 100' for sector/cell A') and single stream transmission from cell/sector B" (e.g., from radio base station 100" for sector/cell B"); X/XX represents single stream transmission from cell/sector A' (e.g., from radio base station 100' for sector/cell A') and dual stream transmission from cell/sector B" (e.g., from radio base station 100" for cell/sector B"); XX/XX represents dual stream transmission from both cells/sectors A' and B" (e.g., from radio base station 100' for sector/cell A', and from radio base station 100" for sector/cell B"). By exploring properties of the tables of FIGS. 7A-D, a new codebook may be derived according to some additional embodiments of inventive concepts.

An example of a codebook according to some embodiments of inventive concepts using the codeword combinations of FIGS. 7A-D is given in the table of FIG. 8 which may be saved in memory 218 of each wireless terminal 200 and in memory 118 of each base station 100. Design principles for the codebook of FIG. 8 may include:

(1) Each site (e.g., each base station 100' and 100") can use information about the number of its own scheduled streams that were scheduled in the decoding process (e.g., if an HS-SCCH or High-Speed-Shared-Control-Channel is detected, then the correct information will likely be decoded).

(a) In the table of FIG. 8, several messages use the same codeword to indicate different HARQ-ACK messages. By way of example: A/A, A/AA, AA/A, and AA/AA (codebook entry 9 of FIG. 8) may use the same codeword (i.e., "1001010110"); A/N, A/NN, AA/N, and AA/NN (codebook entry 10 of FIG. 8) may use the same codeword (i.e., "1010011001"); N/A, N/AA, NN/A, and NN/AA (codebook entry 11 of FIG. 8) may use the same codeword (i.e., "0001101101"); and N/N, N/NN, NN/N, and NN/NN (codebook entry 12 of FIG. 8) may use the same code word (e.g., "0111110000"). Hence, the decoding process may need to take this into consideration by including the appropriate codewords in the decoding process. The appropriate codewords may depend on whether one or two streams were scheduled by the own cell (NodeB) as indicated in the table of FIG. 7.

(b) Note that some codewords appear in several groups (see the table of FIG. 7). For example, the codeword A/D appears in the three groups: site-1 (cell/sector A' of base station 100') schedules 1 stream; site-2 (cell/sector B" of base station 100") schedules 1 stream; and site-2 (cell/sector B" of base station 100") schedules 2 streams.

(2) All codewords in the tables of FIGS. 7A-D (corresponding to the codebook entries of FIG. 8) are taken from a common codebook with a minimum Hamming distance of four. Accordingly, every combination of codewords from FIG. 8 may have a minimum Hamming distance of at least four.

(3) Performance for single stream scheduling may be increased and/or maximized. A Hamming distance between N/A and A/A, between N/A and A/N, between N/A and A/D, between N/A and A/AN, and between N/A and ANA may be six or greater. Similarly, a Hamming distance between A/N and A/A, between A/N and N/A, between A/N and D/A, between A/N and AN/A, and between A/N and NA/A may be six or greater. This Hamming distance may be beneficial because these error events may result in RLC (Radio Link Control) retransmissions. Also, the A/N or N/A codewords may be the most frequent "worst case" codewords (compared, for example, to N/N) because a typical network operates at a rather large ACK rate (e.g., 90% of all initial transmissions may be ACKed or acknowledged).

(4) A minimum Hamming distance for the options when site-1 (cell/sector A' of base station 100') schedules two streams and site-2 (cell/sector B" of base station 100") schedules two streams may be three.

(5) Legacy POST/PRE codewords may be supported, and a minimum Hamming distance may be at least four when POST and/or PRE are included. As used herein, POST is a POSTAMBLE codeword that may be transmitted before the actual acknowledgement codeword, and PRE is a PREAMBLE that may be transmitted after the actual acknowledgement codeword.

Because codeword remapping (i.e., changing the definition of a code word), bit permutation, and/or bit-wise masking will not change the basic minimum Hamming property of a codebook, codebooks can be considered that can be obtained through these operations starting from a proposed codebook according to embodiments of inventive concepts. Such operations, however, may change individual distance properties between different codewords.

According to some embodiments of inventive concepts, HARQ-ACK information for MF-HSDPA configured with two cells and MIMO may be acknowledged using a SF256 approach.

Operations of base stations and wireless terminals according to some embodiments of inventive concepts will now be discussed with reference to the flow diagrams of FIG. 9 (relating to base station operations) and FIG. 10 (relating to wireless terminal operations) using the HARQ-ACK codebook of FIGS. 6A and 6B. Operations of FIGS. 9 and 10 will be discussed together because operations of the base station(s) and wireless terminal are interleaved. While operations of FIGS. 9 and 10 are discussed by way of example with respect to the HARQ-ACK codebook of FIGS. 6A and 6B, operations of FIGS. 9 and 10 may be performed using other HARQ-ACK codebooks, such as the HARQ-ACK codebook of FIG. 8.

Figure 9:
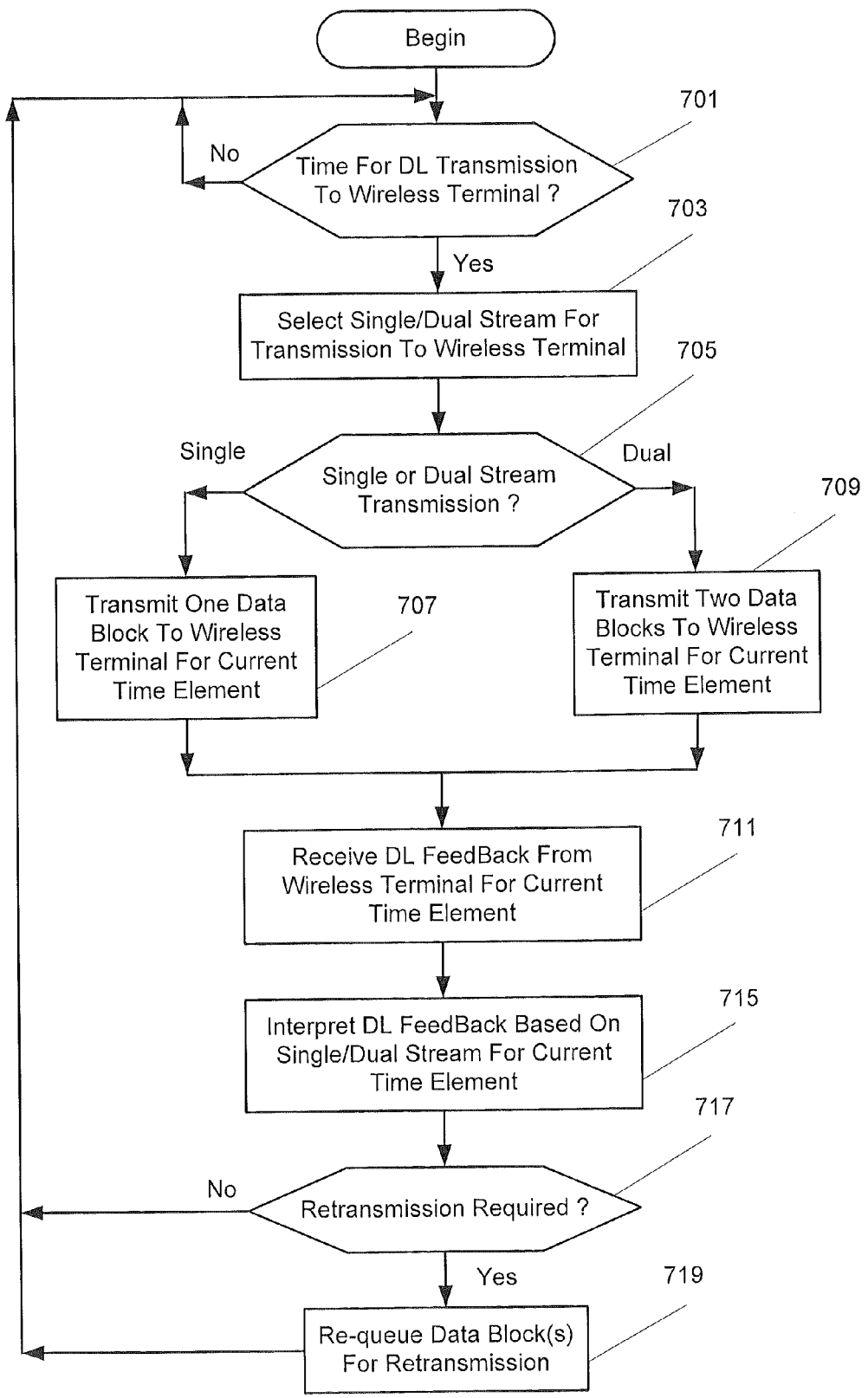
FIG. 9 is a flow diagram illustrating base station operations according to some embodiments.
Figure 10:
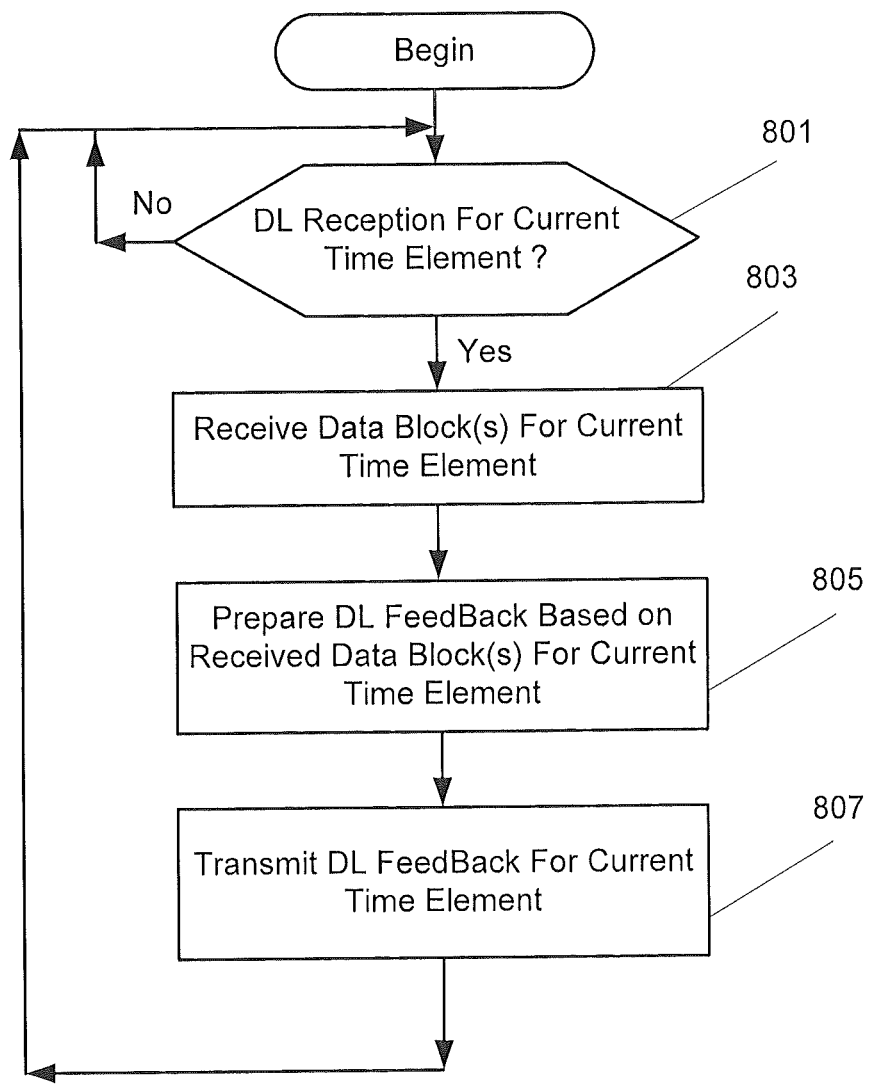
FIG. 10 is a flow diagram illustrating wireless terminal operations according to some embodiments.

During MF-HSDPA operations, operations of FIG. 9 may be performed simultaneously for two different sectors/cells of the same or different base stations (e.g., sectors/cells A and B of FIG. 3A, or sectors/cells A' and B'' of FIG. 3B). In the following discussion, operations of FIG. 9 will be discussed with respect to base station operations for a primary sector/cell A or A' for ease of discussion, and it will be understood that operations of FIG. 9 may be performed simultaneously for a secondary sector/cell B or B'' at the same or different base stations.

In FIG. 9, base station controller 101 may determine at block 701 that the time has arrived for a next downlink (DL) transmission to wireless terminal 200, and at block 703, base station controller 101 may select either single stream (transmitting only a single transport data block) or dual stream (transmitting two transport data blocks simultaneously) for transmission from primary cell/sector A or A' to wireless terminal 200 during a current time resource element (also referred to as a transmission time interval or TTI). The same or adjacent base station for the secondary cell/sector B or B'' may also separately select single or dual stream transmission for transmission from secondary cell/sector B or B'' during the same time resource element.

Primary base station controller 101 may then transmit (through sector transceiver 109a or 109a' and sector antenna array 117a or 117a') either one transport data block to wireless terminal 200 for the current time resource element at block 707 for single stream transmission, or two transport data blocks to wireless terminal 200 for the current time resource element at block 709 for dual stream transmission. Secondary base station controller 101 may similarly transmit (through sector transceiver 109b or 109b'' and sector antenna array 117b or 117b'') either one transport data block to wireless terminal 200 for the current time resource element at block 707 for single stream transmission, or two transport data blocks to wireless terminal 200 for the current time resource element at block 709 for dual stream transmission.

Upon determining that the current time resource element for downlink reception has arrived at block 801, wireless terminal processor 201 may receive transport data blocks from primary and secondary cells/sectors at block 803 (through antenna array 217 and transceiver array 209). During the current time resource element, wireless terminal 200 may simultaneously receive one transport data block from the primary cell/sector and one transport data block from the secondary cell/sector, one transport data block from the primary cell/sector and two transport data blocks from the secondary cell/sector, two transport data blocks from the primary cell/sector and one transport data block from the secondary cell/sector, or two transport data blocks from the primary cell/sector and two transport data blocks from the secondary cell/sector. Moreover, the base station controllers of the primary and secondary cells/sectors may be unaware of the number of transport data blocks transmitted by the other cell/sector during the current time resource element if the primary and secondary cells/sectors belong to different base stations.

At block 805, wireless terminal processor 201 prepares a feedback message for the downlink transmission based on the transport data block(s) received simultaneously from the primary and secondary cells/sectors during the current time resource element. More particularly, the feedback message can include a codeword from the HARQ-ACK codebook of FIGS. 6A and 6B (or from the HARQ-ACK codebook of FIG. 8) discussed above, wherein the codeword provides acknowledgement information for each transport data block received during the current time resource element. As discussed above, some codewords may have different interpretations, and the correct one of the different interpretations may be selected at the base station(s) for each transport data block transmitted from the respective cell/sector based on whether single or dual stream transmission was selected for the respective cell/sector. More particularly, the feedback message can be prepared according to a HS-DPCCH format (of FIG. 4) with a 10 bit codeword (e.g., selected from the codebook of FIGS. 6A and 6B or selected from the codebook of FIG. 8) and with 20 bits of CQI information.

The feedback message is transmitted by wireless terminal processor 201 through transceiver 209 and antenna array 217 over wireless channel(s) 300 to the primary cell/sector A or A' and the secondary cell/sector B or B''. More particularly, the same feedback message is transmitted according to an HS-DPCCH format to both primary and secondary cells/sectors.

Upon receiving the feedback message at block 711 at the primary and secondary cells/sectors, the respective base station controller(s) proceeds to interpret the codeword of the feedback message for each transport data block transmitted from each cell/sector for the time resource element at block 715 based on whether a single or dual stream transmission was provided from the respective cell/sector for the time resource element and based on the status of the respective cell/sector as the primary or secondary cell/sector for the multi-flow downlink transmission. By way of example, using the codebook of FIGS. 6A and 6B, base station controller(s) 101 for the primary cell/sector A or A' and for secondary cell/sector B and B'' interprets the codeword "0010100001" (codebook entries 13 and 33) as an acknowledgement for one transport data block when a single stream transmission was provided, and as an acknowledgement for two transport data blocks when a dual stream transmission was provided. The codebook of FIG. 8 can be used in a similar way. Again using the codebook of FIGS. 6A and 6B, base station controller 101 for the primary cell/sector A or A' interprets the codeword "0111000110" (codebook entries 14 and 44) as an acknowledgement for one transport data block when a single stream transmission was provided, and as a negative acknowledgement for a first transport data block and an acknowledgement for a second transport data block when a dual stream transmission was provided. In contrast, using the codebook of FIGS. 6A and 6B, base station controller 101 for the secondary cell/sector B or B'' may interpret the same codeword "0111000110" (codebook entries 14 and 44) as a negative acknowledgement for one transport data block when a single stream transmission was provided from the secondary cell/sector, and as a negative acknowledgement for both transport data blocks when a dual stream transmission was provided. Different interpretations of the codewords "0010100001" (codebook entries 13 and 33), "0111000110" (codebook entries 14 and 44), "1000111111" (codebook entries 15 and 43), and "1101001010" (codebook entries 16 and 35) may be determined as discussed above with respect to codebook entries 13, 14, 15, 16, 33, 35, 43, and 44 of FIGS. 6A and 6B. Similarly, codebook entries 1-2, 5-6, and 9-20 from the codebook of FIG. 8 may have different interpretations for the primary sector and/or for the secondary sector depending on the number of transport data blocks that were transmitted by the respective sector during the respective time resource element. Other codebook entries (e.g., codebook entries 1-12, 17-32, 34, 36-42, and 45-48 from the codebook of FIGS. 6A and 6B, or codebook entries 3-4, 7-8, and 21-24 from the codebook of FIG. 8) may have only one interpretation for the primary sector and only one interpretation for the secondary sector.

At block 717, the base station controller(s) 101 for the primary and secondary cells/sectors may determine if retransmission of one or more of the transport data blocks is required responsive to the codeword received with the feedback message. If retransmission is required at block 717, the appropriate transport data block(s) may be re-queued for retransmission at block 719. At block 701, base station controller(s) 101 may wait for a next time resource element for transmission to wireless terminal before repeating operations of FIG. 9 for a next multi-flow transmission to wireless terminal 200.

Figure 11:
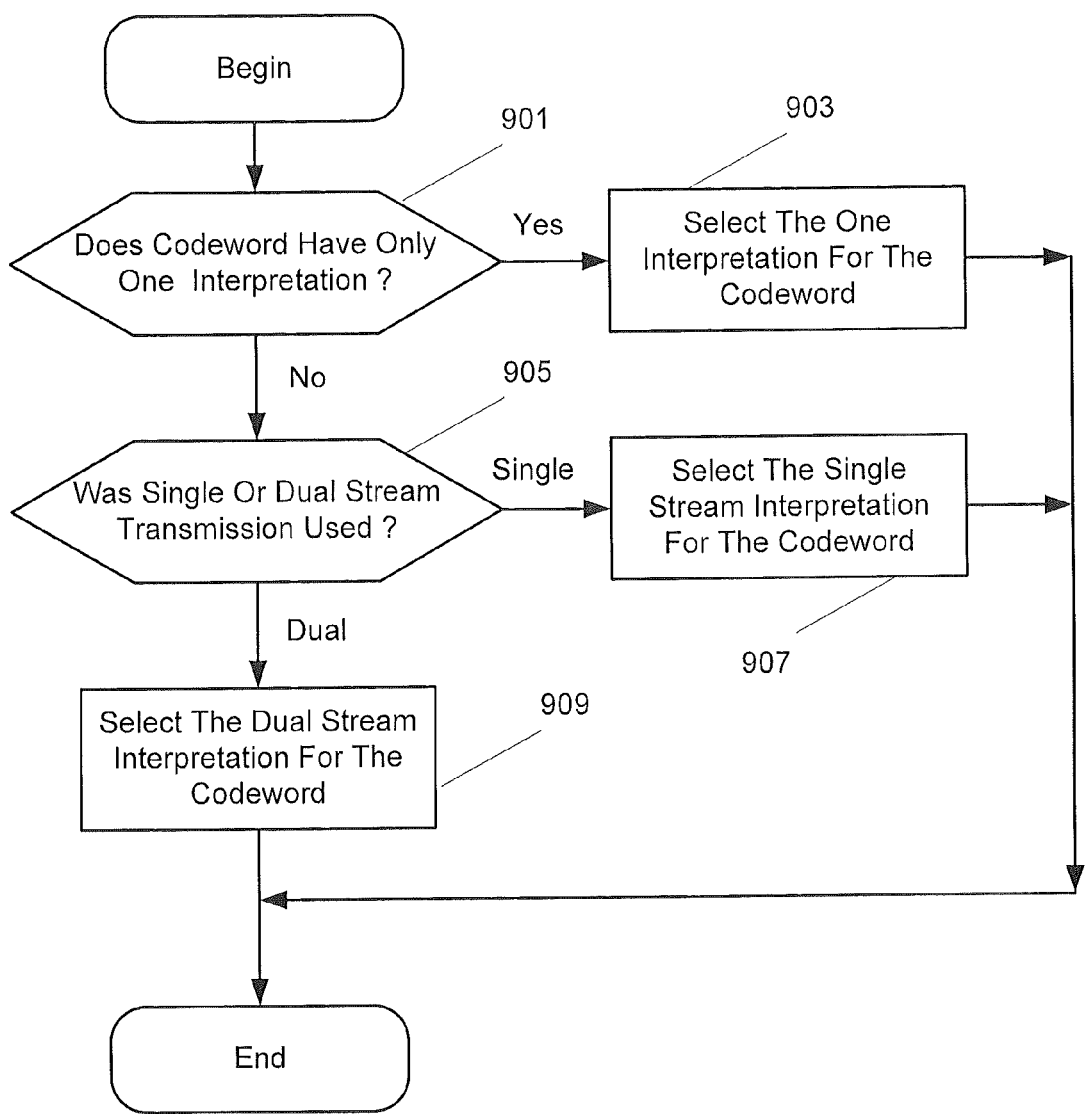
FIG. 11 is a flow diagram illustrating base station operations to interpret codewords according to some embodiments.

Base station operations of block 715 of FIG. 9 interpreting feedback codewords (from the codebook of FIGS. 6A and 6B or from the codebook of FIG. 8) are discussed in greater detail below with respect to the flow diagram of FIG. 11.

At block 901, base station controller 101 may determine if the codeword has only one interpretation or if two different interpretations are possible. If the codeword has only one interpretation for the respective cell/sector, then base station processor 101 selects the one interpretation for the codeword at block 903 and proceeds to block 717 using the only available interpretation of the codeword. In the codebook of FIGS. 6A and 6B, for example, each of codebook entries 1-12, 17-32, 34, 36-42, and 45-48 is assigned a unique codeword so that further interpretation is not required. In the codebook of FIG. 8, each of codebook entries 3-4, 7-8, and 21-24 has only a single interpretation for the primary cell/sector and only a single interpretation for the secondary cell/sector. In FIGS. 6A and 6B and in FIG. 8 the message abbreviation(s) (e.g., A=acknowledge or ACK, N=negative acknowledge or NACK, and D=discontinuous transmission or DTX) before the backslash apply to the transport data block or blocks transmitted by the primary sector (e.g., sector A of base station 100 or sector A' of base station 100'), and the message abbreviation(s) after the backslash apply to the transport data block or blocks transmitted by the secondary sector (e.g., sector B of base station 100 or sector B'' of base station 100'').

If the codeword has two possible interpretations for a cell/sector at block 901, then base station processor 101 determines if the codeword corresponds to a single or dual stream transmission for that base station cell/sector at block 905. In the codebook of FIGS. 6A and 6B, for example, four codewords (for codebook entries 13-16, 33, 35, and 43-44) have two possible interpretations for each cell/sector as indicated below:

| Codeword | 1$^{st}$ Interpretation (Single Stream) | 2$^{nd}$ Interpretation (Dual Stream) |
|---|---|---|
| 0010100001 | A/A (Entry 13) | AA/AA (Entry 33) |
| 0111000110 | A/N (Entry 14) | NA/NN (Entry 44) |
| 1000111111 | N/A (Entry 15) | NA/NA (Entry 43) |
| 1101001010 | N/N (Entry 16) | AA/NA (Entry 35) |

In the codebook of FIG. 8, sixteen codewords (for codebook entries 1-2, 5-6, and 9-20 of FIG. 8) have at least two possible interpretations for at least one of the cells/sectors. For single stream transmissions from a cell/sector, the single stream interpretation is selected for the cell/sector at block 907, and for dual stream transmission from a cell/sector, the dual stream interpretation for the cell/sector is selected at block 909.

For codeword "0010100001" of FIGS. 6A and 6B for single stream transmission from both cells/sectors, an acknowledge (A or ACK) is interpreted for the transport data block transmitted from the primary sector (A or A') and for the transport data block transmitted from the secondary sector (B or B'') as shown by codebook entry 13. For codeword "0010100001" of FIGS. 6A and 6B for dual stream transmission from both cells/sectors, an acknowledge (A or ACK) is interpreted for both transport data blocks transmitted from the primary sector (A or A') and for both transport data blocks transmitted from the secondary sector (B or B'') as shown by codebook entry 33. For codeword "0111000110" of FIGS. 6A and 6B for single stream transmission from both cells/sectors, an acknowledge (A or ACK) is interpreted for the transport data block transmitted from the primary sector (A or A') and a negative acknowledge (N or NACK) is interpreted for the transport data block transmitted from the secondary sector (B or B'') as shown by codebook entry 14. For codeword "0111000110" for dual stream transmission of FIGS. 6A and 6B for dual stream transmission from both cells/sectors, a negative acknowledge (N or NACK) is interpreted for a first transport data block transmitted from the primary sector (A or A'), an acknowledge (A or ACK) is interpreted for a second transport data block transmitted from the primary sector (A or A'), and a negative acknowledge (N or NACK) is interpreted for both transport data blocks transmitted from the secondary sector (B or B'') as shown by codebook entry 44. For codeword "1000111111" of FIGS. 6A and 6B for single stream transmission from both cells/sectors, a negative acknowledge (N or NACK) is interpreted for the transport data block transmitted from the primary sector (A or A') and an acknowledge (A or ACK) is interpreted for the transport data block transmitted from the secondary sector (B or B'') as shown by codebook entry 15. For codeword "1000111111" of FIGS. 6A and 6B for dual stream transmission from both cells/sectors, a negative acknowledge (N or NACK) is interpreted for a first transport data block transmitted from the primary sector (A or A'), an acknowledge (A or ACK) is interpreted for a second transport data block transmitted from the primary sector (A or A'), a negative acknowledge (N or NACK) is interpreted for a first transport data block transmitted from the secondary sector (B or B''), and an acknowledge (A or ACK) is interpreted for a second transport data block transmitted from the secondary sector (B or B'') as shown by codebook entry 43. For codeword "1101001010" of FIGS. 6A and 6B for single stream transmission from both cells/sectors, a negative acknowledge (N or NACK) is interpreted for the transport data block transmitted from the primary sector (A or A') and for the transport data block transmitted from the secondary sector (B or B'') as shown by codebook entry 16. For codeword "1101001010" of FIGS. 6A and 6B for dual stream transmission from both cells/sectors, an acknowledge (A or ACK) is interpreted for both transport data blocks transmitted from the primary sector (A or A'), a negative acknowledge (N or NACK) is interpreted for a first transport data block transmitted from the secondary sector (B or B''), and an acknowledge (A or ACK) is interpreted for a second transport data block transmitted from the secondary sector (B or B'') as shown by codebook entry 35.

The codebook of FIG. 8 can be used in a similar way to that described above with respect to the codebook of FIGS. 6A and 6B. For codeword "0001101101" (entry 11 of the codebook of FIG. 8) for single stream transmission from both primary and secondary sectors, for example, a negative acknowledge (N or NACK) is interpreted for the transport data block from the primary sector (A or A') and an acknowledge (A or ACK) is interpreted for the transport data block transmitted from the secondary sector (B or B"). For codeword "0001101101" (entry 11 of the codebook of FIG. 8) for dual stream transmission from both primary and secondary sectors, for example, a negative acknowledge (N or NACK) is interpreted for both transport data blocks from the primary sector (A or A') and an acknowledge (A or ACK) is interpreted for both transport data blocks transmitted from the secondary sector (B or B"). For codeword "0001101101" (entry 11 of the codebook of FIG. 8) for single stream transmission from the primary sector and dual stream transmission from the secondary sector, for example, a negative acknowledge (N or NACK) is interpreted for the transport data block from the primary sector (A or A') and an acknowledge (A or ACK) is interpreted for both transport data blocks transmitted from the secondary sector (B or B"). For codeword "0001101101" (entry 11 of the codebook of FIG. 8) for dual stream transmission from the primary sector and single stream transmission from the secondary sector, for example, a negative acknowledge (N or NACK) is interpreted for both transport data block from the primary sector (A or A') and an acknowledge (A or ACK) is interpreted for the transport data block transmitted from the secondary sector (B or B").

Operations of primary and secondary sectors A/A' and B/B" using the codebook of FIG. 8 will now be discussed in greater detail below with respect to the flow charts of FIGS. 9-11 for multi-flow downlink transmissions using only single stream transmission from each of the primary and secondary sectors A/A' and B/B". When using only single stream transmission from each of the primary and secondary sectors A/A' and B/B", only codebook entries 1-2, 5-6, and 9-12 of FIG. 8 may be used. In the following discussion, operations of FIG. 9 will be discussed with respect to operations of each of the primary sector A/A' and the secondary sector B/B" used for MF-HSDPA downlink transmissions.

In FIG. 9, the base station controller(s) for the primary sector A/A' and the secondary sector B/B" may determine at block 701 that the time has arrived for a next downlink (DL) multi-flow transmission to wireless terminal 200, and at block 703, the base station controller(s) may select single stream transmission for each of the primary and secondary sectors A/A' and B/B". According to some embodiments, only single stream transmission from each of the primary and secondary sectors may be supported for multi-flow downlink transmission to reduce a processing burden at the receiving wireless terminal 200. Stated in other words, a first downlink stream may be transmitted from primary sector A/A' and a second downlink stream may be transmitted for secondary sector B/B" so that wireless terminal 200 receives only the first downlink stream from the primary cell/sector and the second downlink stream from the secondary cell/sector. Accordingly, the base station controller(s) may transmit a first transport data block from primary sector A/A' of the network and a second transport data block from secondary sector B/B" over a downlink during a time resource element for the multi-flow downlink transmission to wireless terminal 200 at block 707.

Upon determining that the current time resource element for downlink transmission has arrived at block 801, wireless terminal processor 201 may receive the first and second transport data blocks from the respective primary and secondary sectors A/A' and B/B" at block 803 (through antenna array 217 and transceiver array 209). At block 805, wireless terminal processor 201 prepares a feedback message based on the first and second transport data blocks received simultaneously from the primary secondary cells/sectors during the current time resource element. In embodiments using only a single stream transmission from each of primary cell/sector A/A' and secondary cell/sector B/B" for multi-flow downlink transmissions, the feedback message may be prepared using codewords selected from codebook entries 1-2, 5-6, and 9-12 of FIG. 8 (i.e., using a reduced HARQ-ACK codebook) as set forth in the table of FIG. 12.

The codeword "1110000101" is thus interpreted as ACK for the single transport data block transmitted from primary sector A/A' and as Discontinuous Transmission DTX for the single transport data block transmitted from secondary sector B/B". The codeword "1100101001" is interpreted as NACK for the single transport data block transmitted from primary sector A/A' and as Discontinuous Transmission DTX for the single transport data block transmitted from the secondary sector B/B". The codeword "0111101011" is interpreted as Discontinuous Transmission DTX for the single transport data block transmitted from primary sector A/A' and as ACK for the single transport data block transmitted from secondary sector B/B". The codeword "0010100001" is interpreted as Discontinuous Transmission DTX for the single transport data block transmitted from primary sector A/A' and as NACK for the single transport data block transmitted from secondary sector B/B". The codeword "1001010110" is interpreted as ACK for the single transport data block transmitted from primary sector A/A' and as ACK for the single transport data block transmitted from secondary sector B/B". The codeword "1010011001" is interpreted as ACK for the single transport data block transmitted from primary sector A/A' and as NACK for the single transport data block transmitted from secondary sector B/B". The codeword "0001101101" is interpreted as NACK for the single transport data block transmitted from primary sector A/A' and as ACK for the single transport data block transmitted from secondary sector B/B". The codeword "0111110000" is interpreted as NACK for the single transport data block transmitted from primary sector A/A' and as NACK for the single transport data block transmitted from secondary sector B/B".

Accordingly, some codewords can have different interpretations, and the correct one of the different interpretations may be selected at the base station(s) for each transport data block transmitted from the respective cell/sector based on whether the respective cell/sector is the primary cell/sector for the multi-flow downlink transmission or the secondary cell/sector for the multi-flow downlink transmission. As discussed above, the feedback message can be prepared according to a HS-DPCCH format (of FIG. 4) using the bit codewords noted above.

At block 807, the feedback message is transmitted by wireless terminal processor 201 through transceiver 209 and antenna array 217 over wireless channel(s) 300 to primary cell/sector A/A' and secondary cell/sector B/B". More particularly, the same feedback message is transmitted according to an HS-DPCCH format to both primary and secondary cells/sectors.

Upon receiving the feedback message at primary cell/sector A/A' and secondary cell/sector B/B" at block 711, the respective base station controller(s) proceeds to interpret the codeword of the feedback message for each transport data block transmitted from each cell/sector for the time resource element at block 715 based on whether the respective transport data block was transmitted from the primary or secondary cell/sector.

Using the reduced codebook of FIG. 12, the HARQ-ACK codeword "1010011001" is interpreted as an ACK for the transport data block transmitted from primary cell/sector A/A', and as a NACK for the transport data block transmitted from the secondary cell/sector B/B". Using the reduced codebook of FIG. 12, the HARQ-ACK codeword "0001101101" is interpreted as an NACK for the transport data block transmitted from primary cell/sector A/A', and as a ACK for the transport data block transmitted from the secondary cell/sector B/B". Using the reduced codebook of FIG. 12, the HARQ-ACK codeword "1110000101" is interpreted as an ACK for the transport data block transmitted from primary cell/sector A/A', and as a Discontinuous Transmission DTX for the transport data block transmitted from the secondary cell/sector B/B". Using the reduced codebook of FIG. 12, the HARQ-ACK codeword "1100101001" is interpreted as an NACK for the transport data block transmitted from primary cell/sector A/A', and as a Discontinuous Transmission DTX for the transport data block transmitted from the secondary cell/sector B/B". Using the reduced codebook of FIG. 12, the HARQ-ACK codeword "0111101011" is interpreted as an Discontinuous Transmission DTX for the transport data block transmitted from primary cell/sector A/A', and as an ACK for the transport data block transmitted from the secondary cell/sector B/B". Using the reduced codebook of FIG. 12, the HARQ-ACK codeword "0010100001" is interpreted as a Discontinuous Transmission DTX for the transport data block transmitted from primary cell/sector A/A', and as a NACK for the transport data block transmitted from the secondary cell/sector B/B".

At block 717, the base station controller(s) 101 for the primary cell/sector A/A' and for the secondary cell/sector BM" may determine if retransmission of the first transport data block transmitted from primary cell/sector A/A' or the second transport data block transmitted from the secondary cell/sector B/B" is required responsive to the codeword received with the feedback message. If retransmission is required for either of the first and/or second transport data blocks at block 717, the appropriate transport data block(s) may be re-queued for retransmission at block 719. At block 701, base station controller(s) 101 may wait for a next time resource element for transmission to wireless terminal before repeating operations of FIG. 9 for a next multi-flow transmission to wireless terminal 200. Operations of FIGS. 9 and 10 discussed above with respect to the reduced codebook of FIG. 12 may be performed for intra-node multi-flow transmissions when primary and secondary cells/sectors A and B are provided at a same base station 100, and/or for inter-node multi-flow transmission when primary and secondary cells/sectors A' and B" are provided at different and spaced apart base stations 100' and 100".

The codebook of FIGS. 6A and 6B, the codebook of FIG. 8, and the reduced codebook of FIG. 12 are examples of different embodiments of codebooks that may be used according to different embodiments of inventive concepts. Embodiments of inventive concepts, however, are not limited to these codebooks, and other codebooks may be used according to other embodiments of inventive concepts.

Additional embodiments are discussed below.

Embodiment 1

A method of operating a network node (100, 100') in a wireless communication network including a plurality of base stations, the method comprising:

transmitting (707, 709) at least one transport data block from a sector (A, A') of the network node (100, 100') over a downlink to a wireless terminal (200) during a time resource element;

receiving (711) a downlink feedback message for the time resource element from the wireless terminal (200), wherein the downlink feedback message corresponds to the at least one transport data block transmitted during the time resource element;

interpreting (715) the downlink feedback message based on a number of the at least one transport data block transmitted from the sector (A') of the network node (100, 100') over the downlink to the wireless terminal (200) during the time resource element; and determining (717) whether to retransmit one or more of the at least one transport data block responsive to interpreting the downlink feedback message.

Embodiment 2

The method of Embodiment 1 wherein interpreting the downlink feedback message comprises, selecting (907) a first interpretation for the downlink feedback message responsive to transmitting the at least one transport data block comprising transmitting a single transport data block using a single stream data transmission from the sector (A') of the network node (100, 100'), and selecting (909) a second interpretation for the downlink feedback message responsive to transmitting the at least one transport data block comprising transmitting two transport data blocks using a dual stream data transmission from the sector (A') of the network node (100, 100').

Embodiment 3

The method of Embodiment 2 wherein selecting the first interpretation for the downlink feedback message comprises selecting an acknowledgement (ACK) for the single transport data block transmitted using the single stream data transmission from the sector (A') of the network node (100'), and wherein selecting the second interpretation for the downlink feedback message comprises selecting acknowledgements (ACKs) for each of the two transport data blocks transmitted using the dual stream data transmission from the sector (A') of the network node (100, 100').

Embodiment 4

The method of Embodiment 2 wherein selecting the first interpretation for the downlink feedback message comprises selecting a negative acknowledgement (NACK) for the single transport data block transmitted using the single stream data transmission from the sector (A') of the network node (100, 100'), and wherein selecting the second interpretation for the downlink feedback message comprises selecting negative acknowledgements (NACKs) for each of the two transport data blocks transmitted using the dual stream data transmission from the sector (A') of the network node (100, 100').

Embodiment 5

The method of any one of Embodiments 1-4 wherein the network node comprises a base station.

Embodiment 6

The method of any one of Embodiments 1-5 wherein the downlink feedback message has an HS-DPCCH format including a HARQ-ACK codeword selected from a codebook of HARQ-ACK codewords, and wherein interpreting the downlink feedback message comprises interpreting the HARQ-ACK codeword.

Embodiment 7

The method of any one of Embodiments 1-6, wherein transmitting the at least one transport data block comprises transmitting (707) a first transport data block from the sector (A') over the downlink to the wireless terminal (200) during a first time resource element to provide a single stream downlink transmission during the first time resource element, wherein receiving the downlink feedback message comprises receiving (711) a first downlink feedback message including a codeword for the first time resource element from the wireless terminal (200) wherein the first downlink feedback message including the codeword corresponds to the first transport data block transmitted during the first time resource element, wherein interpreting the downlink feedback message comprises interpreting (715) the codeword to have a first meaning responsive to the single stream downlink transmission during the first time resource element, wherein determining whether to retransmit comprises determining (717) whether retransmission of the first transport data block is required responsive to the first meaning of the codeword, the method further comprising:

transmitting (709) second and third transport data blocks from the sector over a downlink to the wireless terminal during a second time resource element to provide a dual stream downlink transmission during the second time resource element;

receiving (711) a second downlink feedback message including the codeword for the second time resource element from the wireless terminal with the second downlink feedback message including the codeword corresponding to the second transport data block transmitted during the second time resource element, wherein the codeword for the first and second time resource elements is the same codeword;

interpreting (715) the codeword to have a second meaning different than the first meaning responsive to the dual stream downlink transmission during the second time resource element; and determining (717) whether retransmission of the second and/or third transport data block is required responsive to the second meaning of the codeword.

Embodiment 8

The method of any one of Embodiments 1-7,
wherein the sector is a first sector (A),
wherein the downlink comprises a first downlink,
wherein transmitting further comprises transmitting (707, 709) at least one transport data block from a second sector (B) of the network node (100) over a second downlink to the wireless terminal (200) during the time resource element,
wherein the downlink feedback message corresponds to the at least one transport data block transmitted from the first sector (A) during the time resource element and to the at least one transport data block transmitted from the second sector (B), the method further comprising:
interpreting (715) the downlink feedback message based on a number of the at least one transport data block transmitted from the second sector (B) of the network node (100) over the second downlink to the wireless terminal (200) during the time resource element; and
determining (717) whether to retransmit one or more of the at least one transport data block transmitted from the second sector (B) over the second downlink responsive to interpreting the downlink feedback message.

Embodiment 9

A network node (100, 100') in a wireless communication network including a plurality of base stations, the network node comprising:

a transceiver (109) configured to provide communications with a wireless terminal (200); and a processor (101) coupled to the transceiver (109) wherein the processor is configured to transmit at least one transport data block through transceiver (109) from a sector (A, A') of the network node (100, 100') over a downlink to the wireless terminal (200) during a time resource element, to receive a downlink feedback message for the time resource element from the wireless terminal (200) through the transceiver (109) with the downlink feedback message corresponding to the at least one transport data block transmitted during the time resource element, to interpret the downlink feedback message based on a number of the at least one transport data block transmitted from the sector (A') of the network node (100, 100') over the downlink to the wireless terminal (200) during the time resource element, and to determine whether to retransmit one or more of the at least one transport data block responsive to interpreting the downlink feedback message.

Embodiment 10

The network node of Embodiment 9 wherein the processor is configured to interpret the downlink feedback message by, selecting (907) a first interpretation for the downlink feedback message responsive to transmitting the at least one transport data block comprising transmitting a single transport data block using a single stream data transmission from the sector (A') of the network node (100, 100'), and selecting (909) a second interpretation for the downlink feedback message responsive to transmitting the at least one transport data block comprising transmitting two transport data blocks using a dual stream data transmission from the sector (A') of the network node (100, 100').

Embodiment 11

The network node of Embodiment 10 wherein the processor is configured to select the first interpretation for the downlink feedback message by selecting an acknowledgement (ACK) for the single transport data block transmitted using the single stream data transmission from the sector (A') of the network node (100'), and wherein the processor is configured to select the second interpretation for the downlink feedback message by selecting acknowledgements (ACKs) for each of the two transport data blocks transmitted using the dual stream data transmission from the sector (A') of the network node (100, 100').

Embodiment 12

The network node of Embodiment 10 wherein the processor is configured to select the first interpretation for the downlink feedback message by selecting a negative acknowledgement (NACK) for the single transport data block transmitted using the single stream data transmission from the sector (A') of the network node (100, 100'), and wherein the processor is configured to select the second interpretation for the downlink feedback message by selecting negative acknowledgements (NACKs) for each of the two transport data blocks transmitted using the dual stream data transmission from the sector (A') of the network node (100, 100').

Embodiment 13

The network node of any one of Embodiments 9-12 wherein the network node comprises a base station.

29

Embodiment 14

The network node of any one of Embodiments 9-13 wherein the downlink feedback message has an HS-DPCCH format including a HARQ-ACK codeword selected from a codebook of HARQ-ACK codewords, and wherein interpreting the downlink feedback message comprises interpreting the HARQ-ACK codeword.

Embodiment 15

The method of any one of Embodiments 9-14,
wherein the processor is configured to transmit the at least one transport data block by transmitting a first transport data block through the transceiver from the sector (A') over the downlink to the wireless terminal (200) during a first time resource element to provide a single stream downlink transmission during the first time resource element,
wherein the processor is configured to receive the downlink feedback message by receiving a first downlink feedback message including a codeword for the first time resource element through the transceiver from the wireless terminal (200) with the first downlink feedback message including the codeword corresponding to the first transport data block transmitted during the first time resource element,
wherein the processor is configured to interpret the downlink feedback message by interpreting the codeword to have a first meaning responsive to the single stream downlink transmission during the first time resource element,
wherein the processor is configured to determine whether to retransmit by determining whether retransmission of the first transport data block is required responsive to the first meaning of the codeword, and
wherein the processor is further configured to transmit second and third transport data blocks through the transceiver from the sector over a downlink to the wireless terminal during a second time resource element to provide a dual stream downlink transmission during the second time resource element, to receive a second downlink feedback message including the codeword for the second time resource element through the transceiver from the wireless terminal with the second downlink feedback message including the codeword corresponding to the second transport data block transmitted during the second time resource element with the codeword for the first and second time resource elements being the same codeword, to interpret the codeword to have a second meaning different than the first meaning responsive to the dual stream downlink transmission during the second time resource element, and to determine whether retransmission of the second and/or third transport data block is required responsive to the second meaning of the codeword.

Embodiment 16

The method of any one of Embodiments 9-15, wherein the sector is a first sector (A), wherein the downlink comprises a first downlink,
wherein the processor is further configured to transmit at least one transport data block through the transceiver from a second sector (B) of the network node (100) over a second downlink to the wireless terminal (200) during the time resource element,
wherein the downlink feedback message corresponds to the at least one transport data block transmitted from the first sector (A) during the time resource element and to the at least one transport data block transmitted from the second sector (B), and

30 wherein the processor is further configured to interpret the downlink feedback message based on a number of the at least one transport data block transmitted from the second sector (B) of the network node (100) over the second downlink to the wireless terminal (200) during the time resource element, and to determine whether to retransmit one or more of the at least one transport data block transmitted from the second sector (B) over the second downlink responsive to interpreting the downlink feedback message.

Embodiment 17

A method of operating a wireless terminal (200) communicating in a wireless communication network (60) including a plurality of base stations (100), the method including:
receiving (803) multi-flow downlink transmissions including a plurality of transport data blocks from different sectors (A/A', B/B") of the wireless communication network during a time resource element;
preparing (805) a downlink feedback message including an acknowledgement codeword from an acknowledgement codebook with at least one codeword from the acknowledgement codebook having two interpretations depending on whether one or two transport data blocks are received from one of the sectors/cells; and
transmitting (807) the downlink feedback message to the different sectors.

Embodiment 18

A wireless terminal (200) communicating in a wireless communication network (60) including a plurality of base stations (100), the wireless terminal comprising:
a transceiver (209) configured to provide communications with the wireless communication network (60); and
a processor (201) coupled to the transceiver, wherein the processor is configured to receive multi-flow downlink transmissions including a plurality of transport data blocks through the transceiver from different sectors (A/A', BB") of the wireless communication network during a time resource element, to prepare a downlink feedback message including an acknowledgement codeword from an acknowledgement codebook with at least one codeword from the acknowledgement codebook having two interpretations depending on whether one or two transport data blocks are received from one of the sectors/cells, and to transmitting the downlink feedback message through the transceiver to the different sectors.

Embodiment 19

A method communicating in a wireless communication network including a plurality of base stations supporting multi-flow downlink transmissions, the method comprising:
transmitting (707, 709) at least one transport data block from a first sector (A, A') of the network over a downlink to a wireless terminal (200) during a time resource element for a multi-flow downlink transmission to the wireless terminal (200);
transmitting (707, 709) at least one transport data block from a second sector (B, B") of the network over a downlink to a wireless terminal (200) during the time resource element for the multi-flow downlink transmission to the wireless terminal (200);
receiving (711) a feedback message for the time resource element from the wireless terminal (200), wherein the feedback message includes a Hybrid Automatic Repeat Request Acknowledge (HARQ-ACK) codeword selected from a HARQ-ACK codebook providing HARQ-ACK feedback for the at least one transport data block transmitted from the first sector (A, A') and for the at least one transport data block transmitted from the second sector (B, B");

interpreting (715) the HARQ-ACK codeword for the at least one transport data block transmitted from the first sector (A, A') based on a number of the at least one transport data block transmitted from the first sector (A, A') to the wireless terminal (200) during the time resource element; and determining (717) whether to retransmit one or more of the at least one transport data block transmitted from the first sector (A, A') responsive to interpreting the HARQ-ACK codeword.

Embodiment 20

The method of Embodiment 19 further comprising:

interpreting (715) the HARQ-ACK codeword for the at least one transport data block transmitted from the second sector (B, B") based on a number of the at least one transport data block transmitted from the second sector (B, B") to the wireless terminal (200) during the time resource element; and determining (717) whether to retransmit one or more of the at least one transport data block transmitted from the second sector (B, B") responsive to interpreting the HARQ-ACK codeword.

Embodiment 21

A method communicating in a wireless communication network including a plurality of base stations supporting multi-flow downlink transmissions, the method comprising:

transmitting (707, 709) at least one transport data block from a first sector (A, A') of the network over a downlink to a wireless terminal (200) during a time resource element for a multi-flow downlink transmission to the wireless terminal (200);

transmitting (707, 709) at least one transport data block from a second sector (B, B") of the network over a downlink to a wireless terminal (200) during the time resource element for the multi-flow downlink transmission to the wireless terminal (200);

receiving (711) a feedback message for the time resource element from the wireless terminal (200), wherein the feedback message includes a Hybrid Automatic Repeat Request Acknowledge (HARQ-ACK) codeword selected from a HARQ-ACK codebook providing HARQ-ACK feedback for the at least one transport data block transmitted from the first sector (A, A') and for the at least one transport data block transmitted from the second sector (B, B");

interpreting (715) the HARQ-ACK codeword for the at least one transport data block transmitted from the first sector (A, A') based on the first sector being a primary sector for the multi-flow downlink transmission; and determining (717) whether to retransmit one or more of the at least one transport data block transmitted from the first sector (A, A') responsive to interpreting the HARQ-ACK codeword.

Embodiment 22

The method of Embodiment 21 further comprising:

interpreting (715) the HARQ-ACK codeword for the at least one transport data block transmitted from the second sector (B, B") based on the second sector being a secondary sector for the multi-flow downlink transmission; and determining (717) whether to retransmit one or more of the at least one transport data block transmitted from the second sector (B, B") responsive to interpreting the HARQ-ACK codeword.

Abbreviations
3GPP 3rd Generation Partnership Project
E-DCH Enhanced Dedicated Transport Channel
E-DPCCH E-DCH Dedicated Physical Control Channel (FDD only)
E-TFCI E-DCH Transport Format Combination Indicator
HSPA High Speed Packet Access
HSUPA High Speed Uplink Packet Access
MIMO Multiple Inputs Multiple Outputs
QAM Quadrature Amplitude Modulation
RSN Retransmission Sequence number
S-E- Secondary E-DPCCH
DPCCH
SI Study Item
SINR Signal-to-interference-and-noise ratio
UE User Equipment
UL Uplink
WI Work Item In the above-description of various embodiments of inventive concepts, it is to be understood that the terminology used herein is for the purpose of describing particular embodiments only and is not intended to be limiting of inventive concepts. Unless otherwise defined, all terms (including technical and scientific terms) used herein have the same meaning as commonly understood by one of ordinary skill in the art to which inventive concepts disclosed herein belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions can be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

It will be understood that although the terms first, second, third, etc, may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts disclosed herein. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of inventive concepts disclosed herein. All such variations and modifications are intended to be included herein within the scope of inventive concepts disclosed herein. Accordingly, the above disclosed subject matter is to be considered illustrative, and not restrictive, and the appended claims are intended to cover all such modifications, enhancements, and other embodiments, which fall within the spirit and scope of inventive concepts disclosed herein.

That which is claimed is:

1. A method of communicating in a wireless communication network including a plurality of base stations supporting multi-flow downlink transmissions, the method comprising:

transmitting at least one transport data block from a first sector of the network over a downlink to a wireless terminal during a time resource element for a multi-flow downlink transmission to the wireless terminal, wherein the first sector is a primary sector for the multi-flow downlink transmission to the wireless terminal;

transmitting at least one transport data block from a second sector of the network over a downlink to the wireless terminal during the time resource element for the multi-flow downlink transmission, wherein the second sector is a secondary sector for the multi-flow downlink transmission to the wireless terminal;

receiving a feedback message for the time resource element from the wireless terminal, wherein the feedback message includes a Hybrid Automatic Repeat Request Acknowledge (HARQ-ACK) codeword selected from a HARQ-ACK codebook providing HARQ-ACK feedback for the at least one transport data block transmitted from the first sector and for the at least one transport data block transmitted from the second sector, wherein the HARQ-ACK codeword has a first interpretation for the primary sector when a single transport data block is transmitted from the primary sector and a second interpretation when two transport data blocks are transmitted from the primary sector;

interpreting the HARQ-ACK codeword for the at least one transport data block transmitted from the first sector based on the first sector being a primary sector for the multi-flow downlink transmission and based on a number of the at least one transport data block transmitted from the first sector over the downlink to the wireless terminal during the time resource element; and determining whether to retransmit one or more of the at least one transport data block transmitted from the first sector responsive to interpreting the HARQ-ACK codeword;

wherein the HARQ-ACK codebook includes HARQ-ACK codewords for a multi-flow downlink transmission including a single transport data block from each of the primary and secondary sectors during a time resource element, HARQ-ACK codewords for a multi-flow downlink transmission including a single transport data block from the primary sector and two transport data blocks from the secondary sector during a time resource element, HARQ-ACK codewords for a multi-flow downlink transmission including two transport data blocks from the primary sector and a single transport data block from the secondary sector during a time resource element, and HARQ-ACK codewords for a multi-flow downlink transmission including two transport data blocks from each of the primary and secondary sectors during a time resource element, and wherein a minimum Hamming distance of HARQ-ACK codewords within the HARQ-ACK codebook is four.

2. The method of claim 1 further comprising:
interpreting the HARQ-ACK codeword for the at least one transport data block transmitted from the second sector based on the second sector being a secondary sector for the multi-flow downlink transmission; and
determining whether to retransmit one or more of the at least one transport data block transmitted from the second sector responsive to interpreting the HARQ-ACK codeword.

3. The method of claim 2 wherein interpreting the HARQ-ACK codeword for the at least one transport data block transmitted from the first sector based on the first sector being a primary sector for the multi-flow downlink transmission comprises interpreting the HARQ-ACK codeword to have a first meaning for the at least one transport data block transmitted from the first sector, wherein interpreting the HARQ-ACK codeword for the at least one transport data block transmitted from the second sector based on the second sector being a secondary sector for the multi-flow downlink transmission comprises interpreting the HARQ-ACK codeword to have a second meaning for the at least one transport data block transmitted from the second sector, and wherein the first and second meanings are different.

4. The method of claim 3 wherein transmitting the at least one transport data block from the first sector comprises transmitting a single transport data block from the first sector to the wireless terminal during the time resource element, wherein transmitting the at least one transport data block from the second sector comprises transmitting a single transport data block from the second sector to the wireless terminal during the time resource element, wherein the HARQ-ACK codeword is "1010011001," wherein interpreting the HARQ-ACK codeword comprises interpreting the HARQ-ACK codeword for the single transport data block transmitted from the first sector as an ACK, and wherein interpreting the HARQ-ACK codeword comprises interpreting the HARQ-ACK codeword for the signal transport data block transmitted from the second sector as a NACK.

5. The method of claim 3 wherein transmitting the at least one transport data block from the first sector comprises transmitting a single transport data block from the first sector to the wireless terminal during the time resource element, wherein transmitting the at least one transport data block from the second sector comprises transmitting a single transport data block from the second sector to the wireless terminal during the time resource element, wherein the HARQ-ACK codeword is "0001101101," wherein interpreting the HARQ-ACK codeword comprises interpreting the HARQ-ACK codeword for the single transport data block transmitted from the first sector as a NACK, and wherein interpreting the HARQ-ACK codeword comprises interpreting the HARQ-ACK codeword for the signal transport data block transmitted from the second sector as an ACK.

6. The method of claim 3 wherein transmitting the at least one transport data block from the first sector comprises transmitting a single transport data block from the first sector to the wireless terminal during the time resource element, wherein transmitting the at least one transport data block from the second sector comprises transmitting a single transport data block from the second sector to the wireless terminal during the time resource element, wherein the HARQ-ACK codeword is "1110000101," wherein interpreting the HARQ-ACK codeword comprises interpreting the HARQ-ACK codeword for the single transport data block transmitted from the first sector as an ACK, and wherein interpreting the HARQ-ACK codeword comprises interpreting the HARQ-ACK codeword for the signal transport data block transmitted from the second sector as a Discontinuous Transmission.

7. The method of claim 3 wherein transmitting the at least one transport data block from the first sector comprises transmitting a single transport data block from the first sector to the wireless terminal during the time resource element, wherein transmitting the at least one transport data block from the second sector comprises transmitting a single transport data block from the second sector to the wireless terminal during the time resource element, wherein the HARQ-ACK codeword is "1100101001," wherein interpreting the HARQ-ACK codeword comprises interpreting the HARQ-ACK codeword for the single transport data block transmitted from the first sector as a NACK, and wherein interpreting the HARQ-ACK codeword comprises interpreting the HARQ-ACK codeword for the signal transport data block transmitted from the second sector as a Discontinuous Transmission.

8. The method of claim 3 wherein transmitting the at least one transport data block from the first sector comprises transmitting a single transport data block from the first sector to the wireless terminal during the time resource element, wherein transmitting the at least one transport data block from the second sector comprises transmitting a single transport data block from the second sector to the wireless terminal during the time resource element, wherein the HARQ-ACK codeword is "0111101011," wherein interpreting the HARQ-ACK codeword comprises interpreting the HARQ-ACK codeword for the single transport data block transmitted from the first sector as a Discontinuous Transmission, and wherein interpreting the HARQ-ACK codeword comprises interpreting the HARQ-ACK codeword for the signal transport data block transmitted from the second sector as an ACK.

9. The method of claim 3 wherein transmitting the at least one transport data block from the first sector comprises transmitting a single transport data block from the first sector to the wireless terminal during the time resource element, wherein transmitting the at least one transport data block from the second sector comprises transmitting a single transport data block from the second sector to the wireless terminal during the time resource element, wherein the HARQ-ACK codeword is "0010100001," wherein interpreting the HARQ- ACK codeword comprises interpreting the HARQ-ACK codeword for the single transport data block transmitted from the first sector as a Discontinuous Transmission, and wherein interpreting the HARQ-ACK codeword comprises interpreting the HARQ-ACK codeword for the signal transport data block transmitted from the second sector as a NACK.

10. The method of claim 1 wherein transmitting the at least one transport data block from the first sector comprises transmitting a single transport data block from the first sector to the wireless terminal during the time resource element, wherein transmitting the at least one transport data block from the second sector comprises transmitting a single transport data block from the second sector to the wireless terminal during the time resource element, and wherein interpreting the HARQ-ACK codeword comprises interpreting the HARQ-ACK codeword using the HARQ-ACK codebook including:
 codeword "1110000101" interpreted as ACK for the single transport data block transmitted from the first sector and as Discontinuous Transmission for the single transport data block transmitted from the second sector;
 codeword "1100101001" interpreted as NACK for the single transport data block transmitted from the first sector and as Discontinuous Transmission for the single transport data block transmitted from the second sector;
 codeword "0111101011" interpreted as Discontinuous Transmission for the single transport data block transmitted from the first sector and as ACK for the single transport data block transmitted from the second sector;
 codeword "0010100001" interpreted as Discontinuous Transmission for the single transport data block transmitted from the first sector and as NACK for the single transport data block transmitted from the second sector;
 codeword "1001010110" interpreted as ACK for the single transport data block transmitted from the first sector and as ACK for the single transport data block transmitted from the second sector;
 codeword "1010011001" interpreted as ACK for the single transport data block transmitted from the first sector and as NACK for the single transport data block transmitted from the second sector;
 codeword "0001101101" interpreted as NACK for the single transport data block transmitted from the first sector and as ACK for the single transport data block transmitted from the second sector; and
 codeword "0111110000" interpreted as NACK for the single transport data block transmitted from the first sector and as NACK for the single transport data block transmitted from the second sector.

11. The method of claim 1 wherein the first and second sectors are first and second sectors of a same base station.

12. The method of claim 1 wherein the first sector is provided at a first base station and wherein the second sector is provided at a second base station spaced apart from the first base station.

13. The method of claim 1 wherein the feedback message has a High-Speed Physical Dedicated Physical Control Channel (HS-DPCCH) format including the HARQ-ACK codeword.

14. A network node in a wireless communication network supporting multi-flow downlink transmissions, the network node comprising:
 a first transceiver configured to provide communications in a first sector;
 a second transceiver configured to provide communications in a second sector adjacent to the first sector; and
 a processor coupled to the first and second transceivers, wherein the processor is configured to transmit at least one transport data block through the first transceiver to the first sector over a downlink to a wireless terminal during a time resource element for a multi-flow downlink transmission to the wireless terminal wherein the first sector is a primary sector for the multi-flow downlink transmission to the wireless terminal, to transmit at least one transport data block through the second transceiver to the second sector over a downlink to the wireless terminal during the time resource element for the multi-flow downlink transmission wherein the second sector is a secondary sector for the multi-flow downlink transmission to the wireless terminal, to receive a feedback message for the time resource element from the wireless terminal through at least one of the first transceiver and/or the second transceiver wherein the feedback message includes a Hybrid Automatic Repeat Request Acknowledge (HARQ-ACK) codeword selected from a HARQ-ACK codebook providing HARQ-ACK feedback for the at least one transport data block transmitted from the first sector and for the at least one transport data block transmitted from the second sector wherein the HARQ-ACK codeword has a first interpretation for the primary sector when a single transport data block is transmitted from the primary sector and a second interpretation when two transport data blocks are transmitted from the primary sector, to interpret the HARQ-ACK codeword for the at least one transport data block transmitted from the first sector based on the first sector being a primary sector for the multi-flow downlink transmission and based on a number of the at least one transport data block transmitted from the first sector over the downlink to the wireless terminal during the time resource element, and to determine whether to retransmit one or more of the at least one transport data block transmitted to the first sector responsive to interpreting the HARQ-ACK codeword;
 wherein the HARQ-ACK codebook includes HARQ-ACK codewords for a multi-flow downlink transmission including a single transport data block from each of the primary and secondary sectors during a time resource element, HARQ-ACK codewords for a multi-flow downlink transmission including a single transport data block from the primary sector and two transport data blocks from the secondary sector during a time resource element, HARQ-ACK codewords for a multi-flow downlink transmission including two transport data blocks from the primary sector and a single transport data block from the secondary sector during a time resource element, and HARQ-ACK codewords for a multi-flow downlink transmission including two transport data blocks from each of the primary and secondary sectors during a time resource element, and wherein a minimum Hamming distance of HARQ-ACK codewords within the HARQ-ACK codebook is four.

15. The network node of claim 14 wherein the processor is further configured to interpret the HARQ-ACK codeword for the at least one transport data block transmitted from the second sector based on the second sector being a secondary sector for the multi-flow downlink transmission, and to determine whether to retransmit one or more of the at least one transport data block transmitted to the second sector responsive to interpreting the HARQ-ACK codeword.

16. A method of operating a wireless terminal communicating in a wireless communication network including a plurality of base stations supporting multi-flow downlink communications, the method including:

receiving at least one transport data block from a first sector of the wireless communication network during a time resource element for a multi-flow downlink communication, wherein the first sector is a primary sector for the multi-flow downlink transmission to the wireless terminal;

receiving at least one transport data block from a second sector of the wireless communication network during the time resource element for the multi-flow downlink communication, wherein the second sector is a secondary sector for the multi-flow downlink transmission to the wireless terminal;

preparing a feedback message including a hybrid automatic repeat request acknowledgement (HARQ-ACK) codeword from a HARQ-ACK codebook with at least one codeword from the HARQ-ACK codebook having different interpretations for the at least one transport data block from the first sector and for the at least one transport data block from the second sector based on the first sector being a primary sector for the multi-flow downlink communication and the second sector being a secondary sector for the multi-flow downlink communication, wherein the HARQ-ACK codeword has a first interpretation for the primary sector when a single transport data block is transmitted from the primary sector and a second interpretation when two transport data blocks are transmitted from the primary sector; and transmitting the feedback message to the first and second sectors;

wherein the HARQ-ACK codebook includes HARQ-ACK codewords for a multi-flow downlink transmission including a single transport data block from each of the primary and secondary sectors during a time resource element, HARQ-ACK codewords for a multi-flow downlink transmission including a single transport data block from the primary sector and two transport data blocks from the secondary sector during a time resource element, HARQ-ACK codewords for a multi-flow downlink transmission including two transport data blocks from the primary sector and a single transport data block from the secondary sector during a time resource element, and HARQ-ACK codewords for a multi-flow downlink transmission including two transport data blocks from each of the primary and secondary sectors during a time resource element, and wherein a minimum Hamming distance of HARQ-ACK codewords within the HARQ-ACK codebook is four.

17. The method of claim 16 wherein receiving the at least one transport data block from the first sector comprises receiving a single transport data block from the first sector during the time resource element, wherein receiving the at least one transport data block from the second sector comprises receiving a single transport data block from the second sector during the time resource element, and wherein the HARQ-ACK codebook includes:

codeword "1110000101" interpreted as ACK for the single transport data block received from the first sector and as Discontinuous Transmission for the single transport data block received from the second sector;

codeword "1100101001" interpreted as NACK for the single transport data block received from the first sector and as Discontinuous Transmission for the single transport data block received from the second sector;

codeword "0111101011" interpreted as Discontinuous Transmission for the single transport data block received from the first sector and as ACK for the single transport data block received from the second sector;

codeword "0010100001" interpreted as Discontinuous Transmission for the single transport data block received from the first sector and as NACK for the single transport data block received from the second sector;

codeword "1001010110" interpreted as ACK for the single transport data block received from the first sector and as ACK for the single transport data block received from the second sector;

codeword "1010011001" interpreted as ACK for the single transport data block received from the first sector and as NACK for the single transport data block received from the second sector;

codeword "0001101101" interpreted as NACK for the single transport data block received from the first sector and as ACK for the single transport data block received from the second sector; and codeword "0111110000" interpreted as NACK for the single transport data block received from the first sector and as NACK for the single transport data block received from the second sector.

18. A wireless terminal communicating in a wireless communication network including a plurality of base stations supporting multi-flow downlink communications, the method including:

a transceiver configured to provide communications with the wireless communication network; and a processor coupled to the transceiver, wherein the processor is configured to receive at least one transport data block from a first sector of the wireless communication network during a time resource element for a multi-flow downlink communication wherein the first sector is a primary sector for the multi-flow downlink transmission to the wireless terminal, to receive at least one transport data block from a second sector of the wireless communication network during the time resource element for the multi-flow downlink communication wherein the second sector is a secondary sector for the multi-flow downlink transmission to the wireless terminal, to prepare a feedback message including a hybrid automatic repeat request acknowledgement(HARQ-ACK) codeword from a HARQ-ACK codebook with at least one codeword from the HARQ-ACK codebook having different interpretations for the at least one transport data block from the first sector and for the at least one transport data block from the second sector based on the first sector being a primary sector for the multi-flow downlink communication and the second sector being a secondary sector for the multi-flow downlink communication wherein the HARQ-ACK codeword has a first interpretation for the primary sector when a single transport data block is transmitted from the primary sector and a second interpretation when two transport data blocks are transmitted from the primary sector, and to transmit the feedback message to the first and second sectors;

wherein the HARQ-ACK codebook includes HARQ-ACK codewords for a multi-flow downlink transmission including a single transport data block from each of the primary and secondary sectors during a time resource element, HARQ-ACK codewords for a multi-flow downlink transmission including a single transport data block from the primary sector and two transport data blocks from the secondary sector during a time resource element, HARQ-ACK codewords for a multi-flow downlink transmission including two transport data blocks from the primary sector and a single transport data block from the secondary sector during a time resource element, and HARQ-ACK codewords for a multi-flow downlink transmission including two transport data blocks from each of the primary and secondary sectors during a time resource element, and wherein a minimum Hamming distance of HARQ-ACK codewords within the HARQ-ACK codebook is four.

19. A method of claim 1 wherein the time resource element is a first time resource element, wherein the at least one transport data block of the first time resource element from the first sector is a single transport data block, wherein the feedback message is a first feedback message, and wherein interpreting the HARQ-ACK codeword for the single transport data block of the first time resource element comprises interpreting the HARQ-ACK codeword as feedback for one transport data block, the method further comprising:
   transmitting two transport data blocks from the first sector of the network over a downlink to the wireless terminal during a second time resource element for the multi-flow downlink transmission to the wireless terminal, wherein the first sector is the primary sector for the multi-flow downlink transmission to the wireless terminal;
   transmitting at least one transport data block from the second sector of the network over a downlink to the wireless terminal during the second time resource element for the multi-flow downlink transmission, wherein the second sector is the secondary sector for the multi-flow downlink transmission to the wireless terminal;
   receiving a second feedback message for the second time resource element from the wireless terminal, wherein the second feedback message includes the Hybrid Automatic Repeat Request Acknowledge (HARQ-ACK) codeword for the two transport data blocks transmitted from the first sector and for the at least one transport data block transmitted from the second sector during the second time resource element;
   interpreting the HARQ-ACK codeword for the two transport data blocks transmitted from the first sector during the second time resource element based on the first sector being a primary sector for the multi-flow downlink transmission and based on the HARQ-ACK codeword being provided for two transport data blocks transmitted from the first sector; and
   determining whether to retransmit the two transport data blocks transmitted from the first sector during the second time resource element responsive to interpreting the HARQ-ACK codeword as feedback for two transport data blocks.

20. The method of claim 1 wherein the HARQ-ACK codebook includes a first HARQ-ACK codeword that is interpreted by the primary sector as an ACK for one transport data block for the primary sector when a single transport data block is transmitted from the primary sector and that is interpreted by the primary sector as two ACKs for two respective transport data blocks for the primary sector when two transport data blocks are transmitted from the primary sector, and a second HARQ-ACK codeword that is interpreted by the primary sector as a NACK for one transport data block for the primary sector when a single transport data block is transmitted from the primary sector and that is interpreted by the primary sector is a two NACKs for two respective transport data blocks for the primary sector when two transport data blocks are transmitted from the primary sector.

21. The method of claim 20 wherein the first HARQ-ACK codeword is interpreted by the secondary sector as an ACK for one transport data block for the secondary sector when a single transport data block is transmitted from the secondary sector and that is interpreted by the secondary sector as two ACKs for two respective transport data blocks for the secondary sector when two transport data blocks are transmitted from the secondary sector, wherein the second HARQ-ACK codeword is interpreted by the secondary sector as a NACK for one transport data block for the secondary sector when a single transport data block is transmitted from the secondary sector and that is interpreted by the secondary sector as two NACKs for two respective transport data blocks for the secondary sector when two transport data blocks are transmitted from the secondary sector.

22. A method of claim 16 wherein the time resource element is a first time resource element, wherein the at least one transport data block of the first time resource element from the first sector is a single transport data block, and wherein the feedback message is a first feedback message, the method further comprising:
   receiving two transport data blocks from the first sector of the wireless communication network during a second time resource element for the multi-flow downlink communication, wherein the first sector is the primary sector for the multi-flow downlink transmission to the wireless terminal;
   transmitting at least one transport data block from the second sector of the wireless communication network during the second time resource element for the multi-flow downlink communication, wherein the second sector is the secondary sector for the multi-flow downlink transmission to the wireless terminal;
   preparing a second feedback message for the second time resource element, wherein the second feedback message includes the Hybrid Automatic Repeat Request Acknowledge (HARQ-ACK) codeword for the two transport data blocks transmitted from the first sector and for the at least one transport data block transmitted from the second sector during the second time resource element; and
   transmitting the second feedback message to the first and second sectors.

23. The method of claim 16 wherein the HARQ-ACK codebook includes a first HARQ-ACK codeword that is interpreted by the primary sector as an ACK for one transport data block for the primary sector when a single transport data block is transmitted from the primary sector and that is interpreted by the primary sector as two ACKs for two respective transport data blocks for the primary sector when two transport data blocks are transmitted from the primary sector, and a second HARQ-ACK codeword that is interpreted by the primary sector as a NACK for one transport data block for the primary sector when a single transport data block is transmitted from the primary sector and that is interpreted by the primary sector is a two NACKs for two respective transport data blocks for the primary sector when two transport data blocks are transmitted from the primary sector.

24. The method of claim 23 wherein the first HARQ-ACK codeword is interpreted by the secondary sector as an ACK for one transport data block for the secondary sector when a single transport data block is transmitted from the secondary sector and that is interpreted by the secondary sector as two ACKs for two respective transport data blocks for the secondary sector when two transport data blocks are transmitted from the secondary sector, wherein the second HARQ-ACK codeword is interpreted by the secondary sector as a NACK for one transport data block for the secondary sector when a single transport data block is transmitted from the secondary sector and that is interpreted by the secondary sector as two NACKs for two respective transport data blocks for the secondary sector when two transport data blocks are transmitted from the secondary sector.

* * * * *